(12) United States Patent
Hung et al.

(10) Patent No.: US 10,005,668 B1
(45) Date of Patent: Jun. 26, 2018

(54) METHODS FOR INTERCALATING AND EXFOLIATING HEXAGONAL BORON NITRIDE

(71) Applicant: The United States of America as represented by the Administrator of the National Aeronautics and Space Administration, Washington, DC (US)

(72) Inventors: Ching-cheh Hung, Westlake, OH (US); Janet B. Hurst, Columbia Station, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 431 days.

(21) Appl. No.: 14/158,080

(22) Filed: Jan. 17, 2014

Related U.S. Application Data

(60) Provisional application No. 61/754,079, filed on Jan. 18, 2013.

(51) Int. Cl.
*C01B 21/064* (2006.01)

(52) U.S. Cl.
CPC ........ *C01B 21/064* (2013.01); *C01B 21/0648* (2013.01)

(58) Field of Classification Search
None
See application file for complete search history.

(56) References Cited

U.S. PATENT DOCUMENTS

| | | | |
|---|---|---|---|
| 5,998,528 | A | 12/1999 | Tsipursky et al. |
| 7,537,682 | B2 | 5/2009 | Dailly et al. |
| 8,303,922 | B2 | 11/2012 | Lin et al. |
| 2011/0057156 | A1 | 3/2011 | Schaumburg |
| 2011/0086965 | A1 | 4/2011 | Zhi et al. |
| 2011/0200787 | A1 | 8/2011 | Regan et al. |
| 2013/0323150 | A1* | 12/2013 | Jeon ............... C01B 21/0648 423/290 |

OTHER PUBLICATIONS

Connell et al.; Aqueous Dispersions of Few-Layered and Monolayered Hexagonal Boron Nitride Nanosheets from Sonication-Assisted Hydrolysis:Critical Role of Water; The Journal of Physical Chemistry C; 115, 2679-2685; 2011.*
Liang et al.; Chem. Commun.; 47, 5265-5267; 2011.*
Connell et al.; Soluble, Exfoliated Hexagonal Boron Nitride Nanosheets; The Journal of Physical Chemistry Letters; 277-283; 2010.*

* cited by examiner

*Primary Examiner* — Guinever S Gregorio
(74) *Attorney, Agent, or Firm* — Robert H. Earp, III; William M. Johnson

(57) ABSTRACT

Methods that facilitate exfoliation of hexagonal boron nitride (hBN), exfoliated hBN, and associated intermediate products are disclosed. Such a method can include the acts of mixing a sample of hBN with an activation agent (e.g., NaF, etc.) and a selected set of chemicals (e.g., a metal chloride) and intercalating the set of chemicals into the hBN to obtain intercalated hBN. Additionally, such a method can include the acts of hydrating the set of chemicals (i.e., the intercalates), and converting the set of chemicals to a set of oxide nanoparticles when exfoliating the intercalated hBN. The exfoliated hBN can be washed (e.g., with HCl, etc.) to remove remaining nanoparticles.

12 Claims, 23 Drawing Sheets

METHODS FOR INTERCALATING AND EXFOLIATING HEXAGONAL BORON NITRIDE

CROSS-REFERENCE TO RELATED APPLICATIONS

This application claims the benefit of U.S. Provisional Patent application Ser. No. 61/754,079 entitled 'Methods for Intercalating and Exfoliating Hexagonal Boron Nitride' and filed Jan. 18, 2013. The entirety of the above-noted application is incorporated by reference herein.

ORIGIN OF THE INVENTION

The invention described herein was made by employees of the United States Government and may be manufactured and used by or for the Government for Government purposes without the payment of any royalties thereon or therefor.

BACKGROUND

The structural similarity between hexagonal boron nitride (hBN) and graphite is highlighted by the widespread use of term "white graphite" for boron nitride. This similarity has led to the efforts of using carbon chemistry and technology as guidance for research in boron nitride chemistry and technology. Such efforts resulted in the synthesis of cubic boron nitride (cBN) based on the structure of diamond, and boron nitride nanotubes (BNNT) based on the structure of carbon nanotubes.

On the other hand, the differences in chemical bonding between graphite and hBN leads to differences in properties such as electrical conductivity and reactivity to air at high temperature. The ionic interlayer bonding in hBN is much stronger than the Van der Waal force between the graphite layers causing differences in the reactivity in intercalation. This also leads to their differences in the efficiency of mass producing their respective exfoliated products for engineering applications.

A layered material is "intercalated" when other chemicals are inserted into the layers, and a layered material is "exfoliated" when the layered structure split into thinner layers. Graphite can easily be intercalated, and then exfoliated by driving intercalates out of the layers quickly and/or explosively. The process of intercalation-exfoliation of graphite has been applied for engineering applications. Fabrication of flexible graphite, or grafoil, is an example. Recently there are reports that this process has been used to split graphite into graphene in large quantities.

The similarity between carbon and boron nitride suggest the possibility that boron nitride can easily be intercalated and exfoliated as well. However, this is not the case. Starting from hBN instead of graphite, the above process to produce large quantity of exfoliated hBN or "white graphene" has not been successful. Intercalation of hBN is difficult. Alkali metals (Li, Na, and K) and fluorosulfate ($S_2O_6F_2$) are among the few intercalates that have previously been successfully intercalated into h-BN. It involves highly reactive chemicals and reactions. The feasibility of using these chemicals for mass producing exfoliated hBN or "white graphene" was not studied or discussed in these reports. The less reactive intercalates for graphite, such as metal chloride, have been found unreactive to hBN. Most notably among them is ferric chloride ($FeCl_3$). After examining the claims and counter claims, it is generally believed that intercalation of hBN with $FeCl_3$ in particular or metal chloride in general is not likely. For producing exfoliated hBN, the less efficient method of functionalization, sonication and centrifuge is commonly used. For "white graphene," plasma etching or micromechanical cleavage technique have been used for minute quantities.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a method that facilitates exfoliation of a sample of hexagonal boron nitride (hBN). Such a method can include the acts of mixing the sample of hBN with an activation agent (e.g., NaF, etc.) and a selected set of chemicals (e.g., a metal chloride, etc.) and intercalating the set of chemicals into the hBN to obtain intercalated hBN. Additionally, such a method can include the acts of optionally hydrating the set of chemicals (such as, water adsorption from ambient air), evaporating the set of dry or hydrated chemicals and/or converting the set of dry or hydrated chemicals to a set of oxide nanoparticles, resulting in exfoliation of the intercalated hBN. The exfoliated hBN can be washed (e.g., with HCl, etc.) to remove remaining nanoparticles.

In other embodiments, the subject innovation can comprises exfoliated hBN, or one or more intermediate products obtainable during methods of creating exfoliated hBN, such as exfoliated hBN with metal oxide nanoparticles, etc. In other aspects, the subject innovation can comprise ceramic composite compositions and/or articles created from such intermediate products (e.g., from exfoliated hBN with metal oxide nanoparticles, etc.).

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
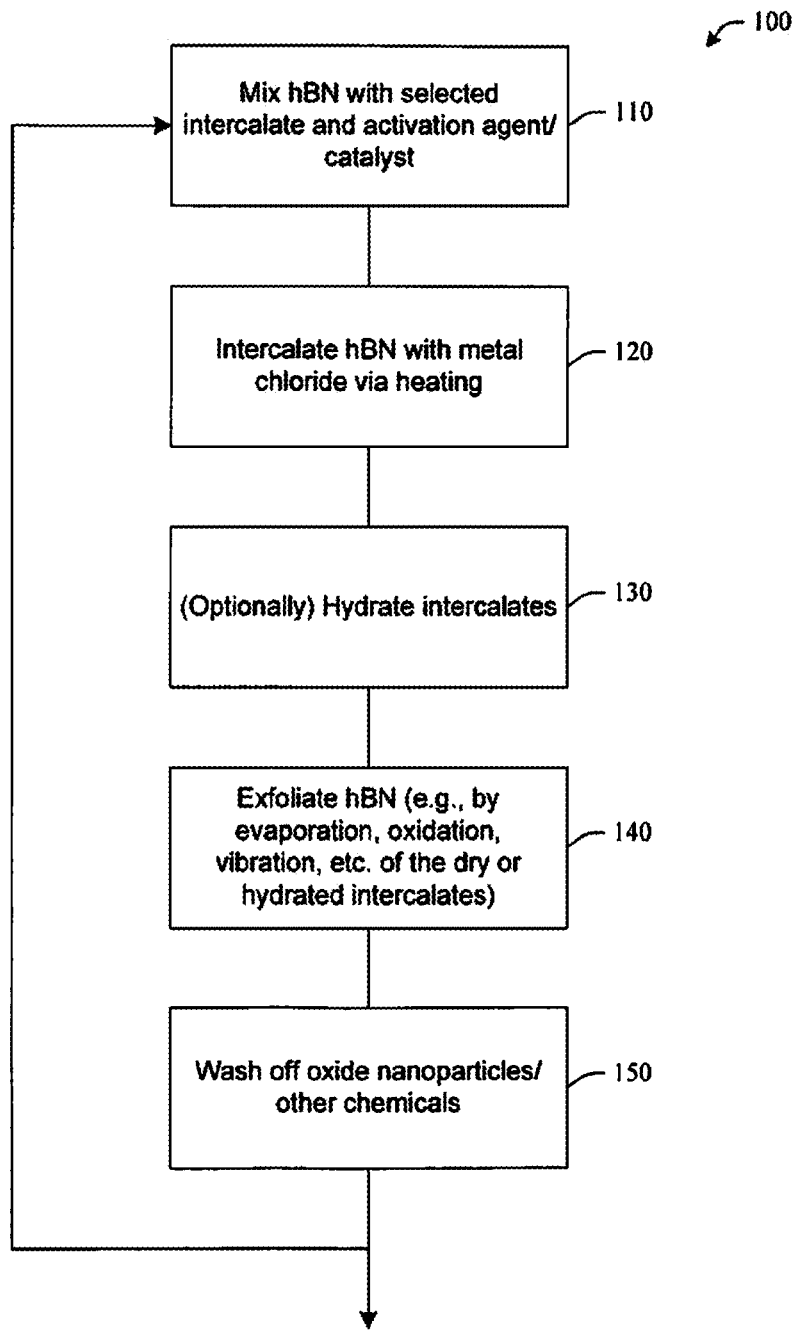
FIG. 1 illustrates a method that can facilitate intercalation and exfoliation of hexagonal boron nitride (hBN) in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Turning to FIG. 1, in various embodiments, the subject innovation can comprise a method 100 that can facilitate intercalation and exfoliation of hexagonal boron nitride (hBN). While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 100 can begin at 110 by creating a mixture of hexagonal boron nitride (hBN) with a selected set of chemicals for intercalation (e.g., a metal chloride, etc.) and an activation agent/catalyst (e.g., NaF, S, etc.). At 120, the selected chemicals can be intercalated into the hBN, for example by heating them in an inert environment (e.g., pure $N_2$, etc.) for a first period of time according to a first heating pattern or histogram (example temperatures and heating times are provided in connection with experiments discussed below). At optional act 130, the intercalates can be hydrated, for example, by placing the intercalated product in a high humidity environment. At 140, the hBN intercalated with dry or hydrated chemicals can be exfoliated, for example by rapid heating in air for a second period of time according to a first heating pattern or histogram (again, examples are discussed below), or by sonication, or a combination thereof. In various embodiments, the subject innovation can comprise the material produced after any of 120, 130 or 140, or articles made thereof, such as ceramic composites made of the exfoliated hBN with metal oxide nanoparticles after act 140 (e.g., by hot pressing exfoliated hBN with metal oxide nanoparticles (e.g., $Al_2O_3$, etc.) at around 2000° C., etc.). Optionally, at 150, the oxide nanoparticles can be washed off of the exfoliated hBN (e.g., with HCl, etc.). The process can be repeated one or more times for additional exfoliation. In some embodiments, the subject innovation can comprise exfoliated hBN (e.g., as obtained via method 100, etc.).

Figure 2:
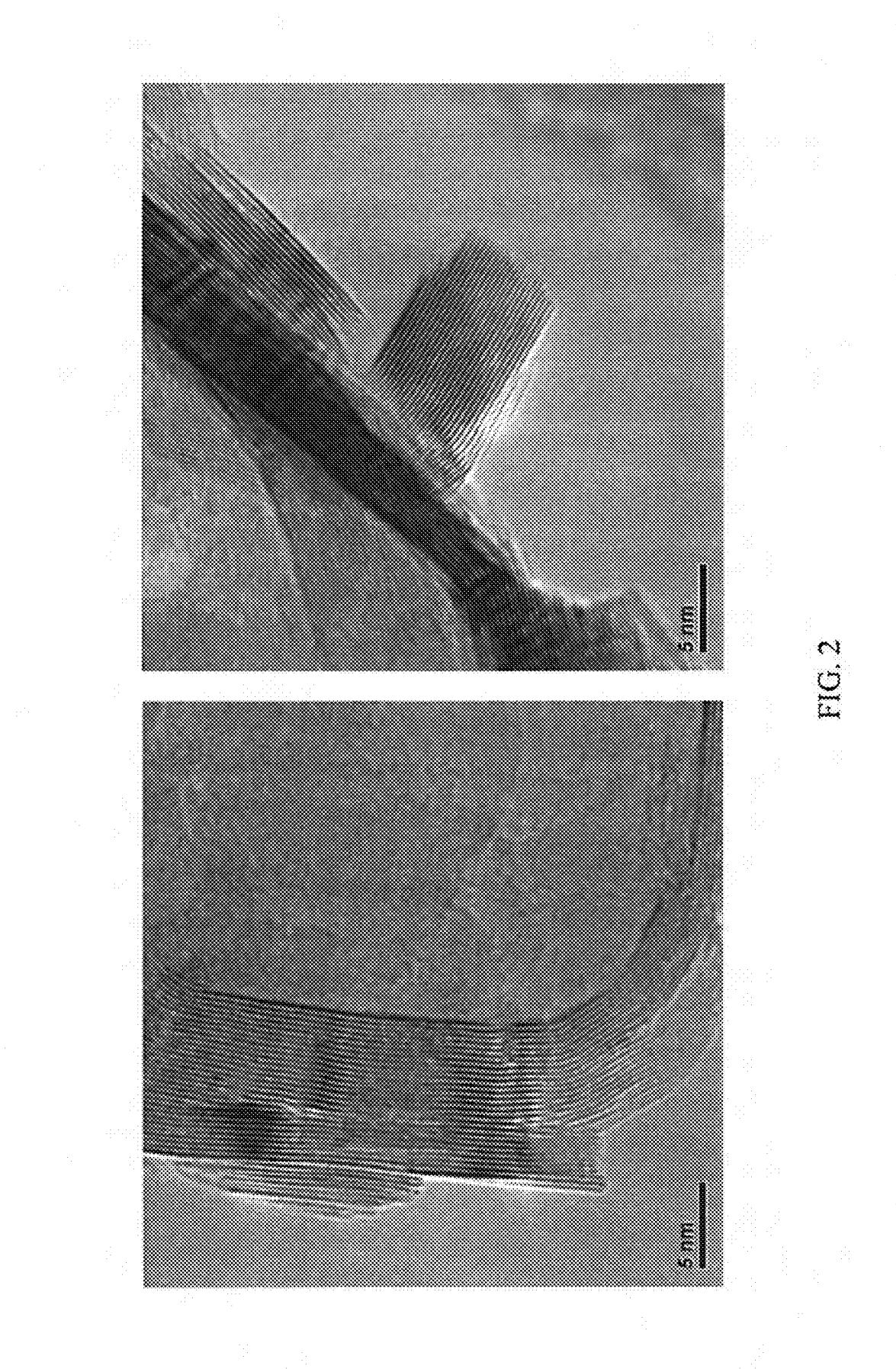
FIG. 2 shows a pair of transmission electron microscopy images of an exfoliated boron nitride nanotube (BNNT) that resulted from removing iron nanoparticles and other impurities from BNNT during purification.

While hexagonal boron nitride (hBN) exfoliation by way of intercalation with metal chloride has not been previously successful, the subject innovation builds upon recent efforts in boron nitride nanotechnology to accomplish exfoliation of hBN via intercalation of metal chlorides. FIG. 2 shows a pair of transmission electron microscopy images of an exfoliated boron nitride nanotube (BNNT) that resulted from removing iron nanoparticles and other impurities from BNNT during purification. Also, although BNNT cannot be intercalated by direct exposure to molten $FeCl_3$, the wetting and cleaning effects of BNNT by $FeCl_3$ have been observed. In addition, BNNT intercalated with potassium and then exfoliated by reacting to water has been successfully demonstrated. This led to a hypothesis leading in part to the subject innovation that, if hBN may be chemically activated similar to BNNT, intercalation of hBN with $FeCl_3$ and subsequent exfoliation may be possible. This hypothesis is in parallel with the experience in carbon intercalation: Some of the graphite intercalation reactions need to be "activated" in order to proceed. For example, iodine cannot be intercalated with graphite unless graphite is "activated" by bromine or HBr.

The subject innovation, in various embodiments, includes methods that can facilitate intercalation and exfoliation of hBN. In other embodiments, the subject innovation includes intermediate products that can be associated with such methods, or articles (e.g., ceramic, composite, etc.) comprising or derived from such intermediate products.

In one embodiment, confirmed through results discussed herein, sodium fluoride (NaF) can be used as a catalyst to successfully intercalate FeCl$_3$ into hexagonal boron nitride (hBN). This reaction, as discussed herein, caused the hBN mass to increase by about 100%, the lattice parameter c to decrease from 6.6585 to 6.6565-6.6569 Å, the x-ray diffraction (002) peak to widen from 0.01 to 0.05° full width half max (FWHM) value, the FT-IR's (Fourier transform infrared spectroscopy) broad band (peaked at 1277 cm$^{-1}$) to change shapes, and new FT-IR bands at 2700-3700 and 1600 cm$^{-1}$ to emerge. This indicates the hBN's structural and chemical properties are significantly changed. The intercalated product was hygroscopic. The moisture picked up from air interacted with intercalated FeCl$_3$, causing further structural and chemical property changes (XRD and FT-IR data). During a 24 hours hold at room temperature with 100% relative humidity air exposure, the mass increased another 141%. All of the above changes were nearly completely reversed after the product was placed in HCl to remove the intercalated FeCl$_3$, indicating the hBN layers were not significantly damaged during the process. The intercalated product, with or without hydration, was heated to 750° C. air to cause exfoliation. The extent of exfoliation was low after one cycle of intercalation-air heating, but became significant during the 2$^{nd}$ cycle, after which 20 nm nanosheets were commonly found.

Methods of the subject innovation can involve reactions based on interactions between hBN and metal chlorides, such as the following examples involving iron chloride (FeCl$_3$):

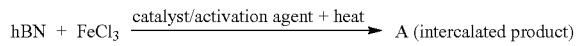
(1)

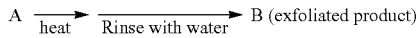
(2)

The chemical reaction experiments employed in the subject innovation for possible intercalation reactions has similarities to those described in previous reports, however, embodiments of the subject innovation can add a catalyst/activating agent such as sodium fluoride (NaF) to the original reactants. Sodium fluoride was considered as a possible catalyst/activating agent for intercalation because its aqueous solution with HCl has been previously observed to attack/activate BNNT. The products of these chemical reactions (A and B) were then further examined for the evidences of intercalation and exfoliation.

In various embodiments, the processes of intercalation and exfoliation described above (or similar processes, e.g., with other metal chlorides, catalysts, etc.) can be repeated in order to see if the additional effort would cause further exfoliation. That is,

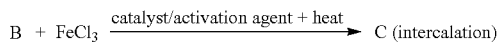
(3)

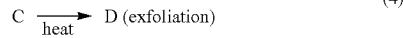
(4)

In various embodiments, the products "A" to "D" can be further treated chemically as follows:

(a) The intercalated and exfoliated products were rinsed with hydrochloric acid (HCl) at room temperature to remove impurities and intercalates:

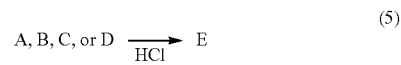
(5)

(b) The intercalated products ("A" or "C") can be exposed to room temperature moist air for a period of time; during experiments such results were characterized several times during this period to study the water-adsorbing characteristics of the apparently hygroscopic intercalated product:

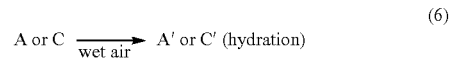
(6)

(c) The hydrated products can be placed into a high temperature furnace or otherwise exposed to rapid heating for the moisture to quickly boil, whereby the adsorbed moisture can provide additional driving force of exfoliation:

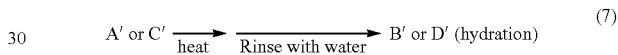
(7)

(d) In further results, the intercalated products "A" were stored in dry air for four months and characterized twice during this period to determine the stability of the intercalated product in dry air.

Two different kinds of commercially available hBN powder were used in experiments discussed herein. The larger one was platelets mostly 20-80 μm wide and 5-10 μm thick. The smaller one was mostly 200-800 nm wide 80-200 nm thick. Both of them are well crystallized, as indicated by their significant XRD (X-ray diffraction) peaks for hBN.

A first set of experiments involved intercalation with ferric chloride (FeCl$_3$). Ferric chloride (FeCl$_3$) (98%) and NaF (99.98%) used in the experiments were commercially purchased from Alfa Aesar. NaF was used as purchased. FeCl$_3$, on the other hand, was distilled once immediately before being used in intercalation reaction because it is highly hygroscopic. Its melting point and boiling point are 306° C. and 315° C., respectively. When it evaporates/sublimates, a fraction simultaneously decomposes into FeCl$_2$ and Cl$_2$. For distillation conducted in this research, it was sublimated/evaporated at about 260-330° C. and then condensed at about 30° C. lower. Based on the vapor pressure and decomposition equations for FeCl$_3$, the vapor pressure of for Cl$_2$ during distillation was 4.4 Torr at 260° C. and 72 Torr at 330° C. The FeCl$_3$ pressure was 51 Torr at 260° C. and 688 Torr at 330° C. under the system of 1 atmosphere total pressure.

The detailed experimental procedures were as follows: Pre-calculated quantities of hBN, distilled FeCl$_3$ and NaF were weighed and mixed into a 50 ml test tube. The test tube was sealed using PTFE (polytetrafluoroethylene) tape, and then placed into a 500 ml reactor kettle, which is then sealed air-tight. Pure nitrogen was then allowed to flow through valves into and out of the kettle to purge air and keep the system in an inert environment during the entire reaction period. The sample at the bottom of the test tube was heated to a temperature slightly below the melting point of $FeCl_3$ (306° C.) for intercalation, and eventually to a temperature slightly above the boiling point of $FeCl_3$ (315° C.) for letting the excess $FeCl_3$ boil and leave the product from the bottom of the test tube and then condense at the top of the tube where the temperature is lower due to the lighter thermal insulation. After the reaction and the system cooled, the product was removed from the test tube and stored in dry environment. Results of the procedure described in this paragraph were products "A" or "C" described above.

Samples of the product "A" were then placed in a quartz watch glass, weighed and placed into a furnace heated to 600-750° C. for a period ranged from 2 to 4 hours using a pre-programmed temperature histogram. After heating, the product was removed from the furnace, cooled and rinsed with water. The result was product "B" described above. This product was then further treated for intercalation according to the procedure described above to have product "C". In this research, some but not all of the products "C" was exposed to moist air, either at ambient humidity or at 100% relative humidity. In all cases, it was then placed in a quartz watch glass, weighed and put into a furnace heated to 600-750° C. for a period ranged from 2 to 4 hours using a pre-programmed temperature histogram, to result in "D".

Concentrated (35 wt %) HCl was used to remove intercalates. Detailed reactant and product mass data and temperature histogram of the experimental runs used for this report are described in Table 1:

width at half maximum (FWHM) values as the peak width for hBN's (002) were calculated using the split-Pearson VII empirical fitting function. The (004), (006), and in some cases (008) peaks for hBN were used to accurately calculate the "c" lattice parameter using the fundamental parameters approach and the Fawley fitting method as implemented in the Bruker TOPAS software program. It is therefore a sensitive method to evaluate the state of intercalation. Non-hygroscopic samples, typically 10 mg in mass, were mounted as a thin layer on a flat "zero" background holder (ZBH), which consisted of a polished silicon wafer cut on a non-diffracting, high-index plane. Hygroscopic intercalated samples were mounted in a 0.5 mm-deep well ZBH holder. The iron and chlorine concentrations for those samples were such that their x-ray penetration depths (95% contribution to the diffracted beam) were typically near 60 μm. Under these conditions, the FWHM values were not affected by the thickness of the samples being scanned.

A Hitachi S-4700II field emission scanning electron microscope (FeSEM) was used to study the morphology throughout the reactions studied in experiments discussed herein. Energy dispersive spectrum (EDS) was used to identify the chemical elements in the products.

The large hBN platelets (mostly 20-80 μm wide 5-10 μm thick) were highly crystalline as seen by sharp and intense XRD peaks. Once intercalated, their layered lattice structure change, with their XRD peaks becoming lower and wider, and their lattice parameters, especially the c parameter which is a measure of the interlayer spacing, will also

TABLE 1

A summary of the intercalation of the as-purchased commercial hBN with $FeCl_3$.

| | Reactants * | | Reaction temperature | | | Products ** | |
|---|---|---|---|---|---|---|---|
| | Mass ratio | | during 2 or 3 steps of | | | | |
| Type of hBN | NaF To hBN | # $FeCl_3$ to hBN | sequential heating in nitrogen Temperature (° C.)/duration (hr) | | | hBN mass content (%) | Label ## |
| L | 0.120 | 2.7 | 315/12 | 340/2 | — | 55 | A1 |
| L | 0.141 | 2.8 | 320/23 | 340/19 | — | 45 | A2 |
| L | 0.115 | 2.3 | 290/14 | 320/30 | 355/16 | 54 | A3 |
| L | 0.190 | 1.7 | 240/25 | 285/22 | 330/21 | 42 | A4 |
| S | 0.14 | 2.7 | 290/3 | 330/38 | — | 45 | A5 |

* The reactants were hBN, NaF and excess amount of ferric chloride. hBN type: L: large platelets. Mostly 20-80 μm wide 5-10 μm thick. S: small platelets. Mostly 200-800 nm wide 80-200 nm thick
** The intercalated products were not washed. They included hBN, the intercalated chemicals, FeOCl and NaCl. The presence of NaCl and the absence of NaF or fluorine atoms were confirmed by XRD and EDS data.
Boiling point of $FeCl_3$ is 315° C. At this temperature, the iron chloride vapor is in the dimer form and is partially decomposed to gaseous $Cl_2$ and solid $FeCl_2$. At one atmosphere under this condition, the equilibrium partial pressure for $Fe_2Cl_6$ and $Cl_2$ are 718 mmHg and 42 mmHg, respectively.
The labels used to identify the products described herein.

For hydration (reaction (6), above), the products A or C were placed on a glass slide and exposed to ambient air with known humidity, or to an enclosed container containing liquid water for 100% relative humidity.

The samples were characterized using Fourier transform infrared spectroscopy (FT-IR), x-ray diffraction (XRD) and field emission scanning electron microscopy (FeSEM).

An Agilent Cary 660 FT-IR with attenuated total reflectance (ATR) accessory was used to characterize IR bands near 1380 and 755 $cm^{-1}$ for boron nitride in the products.

A Bruker D8 Advance X-Ray Diffractometer was used to find x-ray diffraction peaks for hBN and identify the impurities in the products. The samples were normally scanned at 0.02° (2θ value) per step unless otherwise stated when extra precision was required (0.005° per step in that case). The full change. Observation of lattice structure changes at hBN's interior some distance away from the surface, at the reaction temperature of 240-360° C., signals that the chemicals surrounding the platelets may have entered to the interior (i.e., intercalated).

Figure 3:
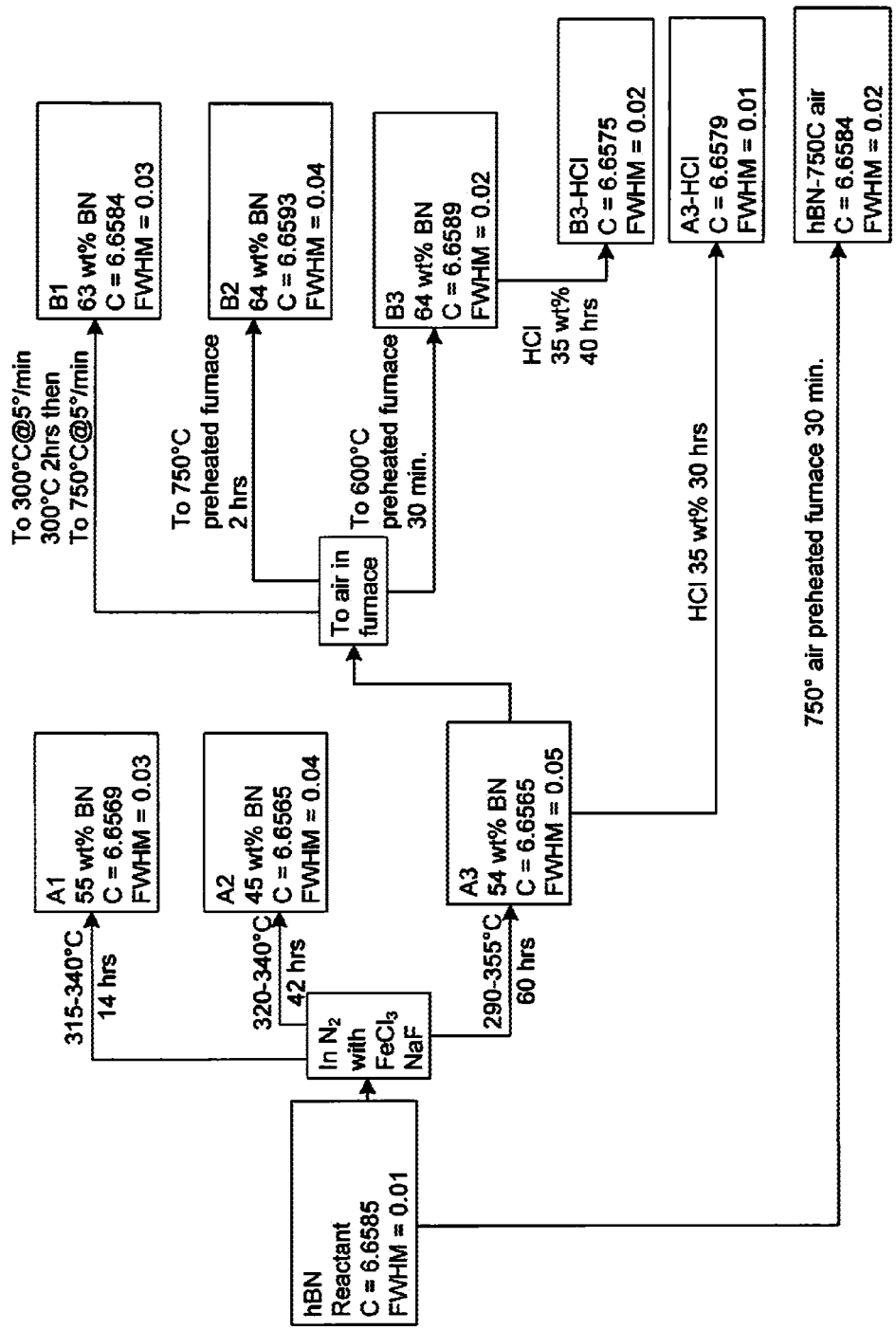
FIG. 3 illustrates examples of intercalation and exfoliation reactions involving $FeCl_3$ that were examined in experiments described herein.

FIG. 3 shows examples of intercalation and exfoliation reactions involving $FeCl_3$ that were examined in experiments described herein. Changes of hBN's (002) peak width (°) and the c parameters (Å) during the reactions suggest the intercalates were in the layers of hBN. The chart in FIG. 3 the experiments conducted in connection with the $FeCl_3$ results where large hBN platelets were intercalated and exfoliated for the first time. The hBN's (002) peak width (FWHM) and the c parameters for the hBN reactant and all intermediate and final products are also included. The precision of the FWHM was estimated to be in the range off ±0.01° based on observation of sample repetitions. This is compared to the 0.01-0.05° of the FWHM values and 0.02° scanning step value during data collection. The lattice parameter data was based on analysis of (004) and (006) peaks. The accuracy and precision was estimated to be in the range of ±0.0005 Å based on observation of sample repetitions and comparison to results with an internal standard. Even though the analysis program generates estimated standard deviations for the lattice parameter results, it is well known that the estimated standard deviation can be over an order of magnitude smaller than the true error. Therefore, the above estimation of error, which is more conservative, is included. After reacting to $FeCl_3$ and NaF, changes in hBN's lattice structures were observed. These changes, however, were mostly restored after the final rinse by 35 wt % HCl to result in pure, exfoliated hBN. According to the reasoning described above, this result indicates that the hBN was most likely intercalated, and mostly if not completely deintercalated to become a thinner product having lattice structure similar to the original reactant, as HCl removed all intercalates.

The (002) peak width, as expected, became wider because intercalation introduced disorderness into the lattice. Potential explanations of the changes of c parameter (and therefore the interplanar spacings between the BN layers) were not investigated. It was slightly decreased during intercalation, then increased to a value slightly larger than the original hBN reactant during exfoliation in 750° C. air, and eventually returned to the original hBN value after HCl treatment.

$FeCl_3$ intercalation also causes interplanar spacings between graphite layers to change. The changes, however, are small and only between graphite layers adjacent to the intercalate layer.

The similarity between the hBN reactant and its intercalated-then-deintercalated product (B3-HCl in FIG. 3) observed here indicates that most if not all intercalates in the hBN layers were removed. This phenomenon is very different from graphite. Completely removing intercalate from graphite layers it is very difficult. The "residue compound" left after the incomplete deintercalation of graphite exhibits XRD peak widths and c parameters generally larger than those of their precursor. This difference is likely because that ionic forces are between the hBN layers, but Van der Waal's force are between graphite layers. The stronger ionic force between the hBN layers could be sufficient to control the distances between the neighboring BN layers and reach the lowest energy state by driving out the chemicals in it. The graphite layers, with the weaker Van der Waal's force between them, will re-shape and eventually tightly enclose a small amount of intercalates in its structure.

Another difference between graphite and hBN intercalation is the lack of staging phenomenon for hBN. In graphite, there are a certain number (n) of carbon layers between two intercalate layers. The regular insertion of intercalate layers into graphite results in a "stage n intercalated product" and new intercalation peaks for XRD. In hBN, the intercalate insertion seems to be random, as no new XRD peaks can be accounted for as "intercalation peaks."

Figure 4:
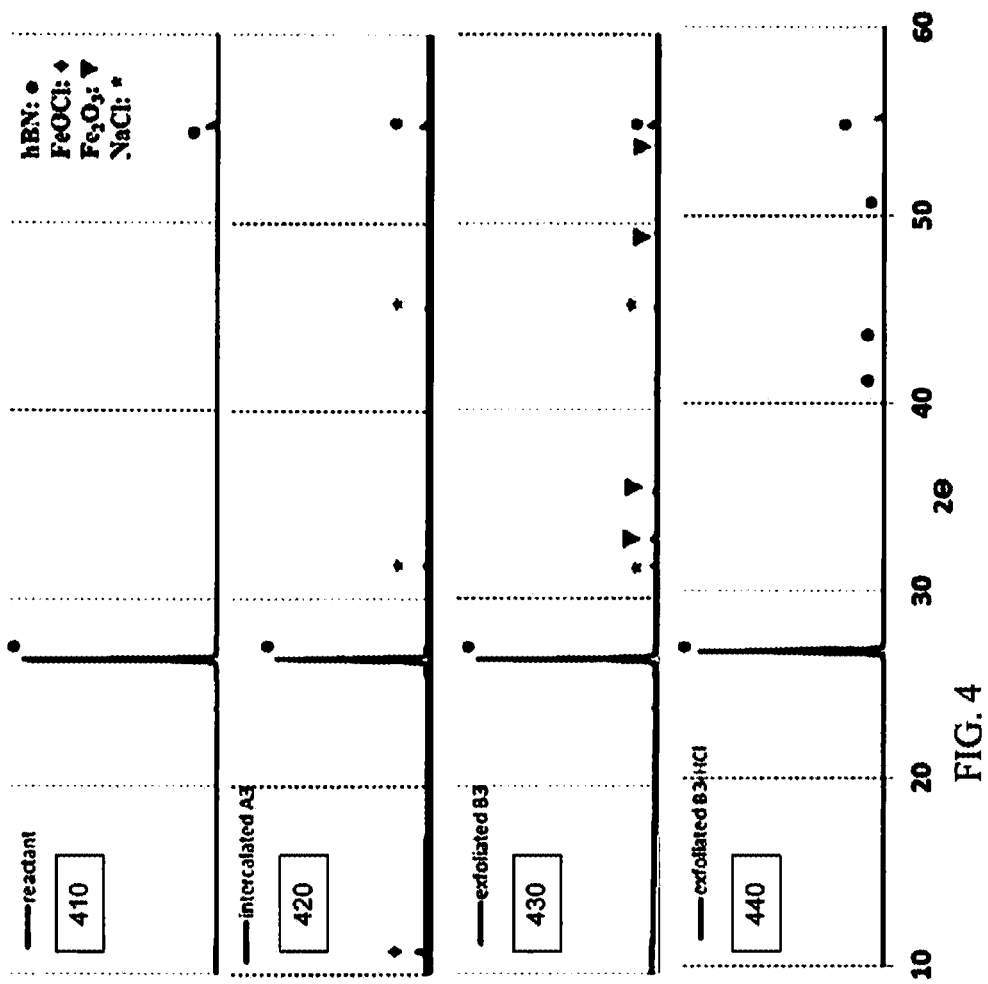
FIG. 4 illustrates X-ray diffraction (XRD) scans of hBN reactant, and products described in FIG. 3.
Figure 4:
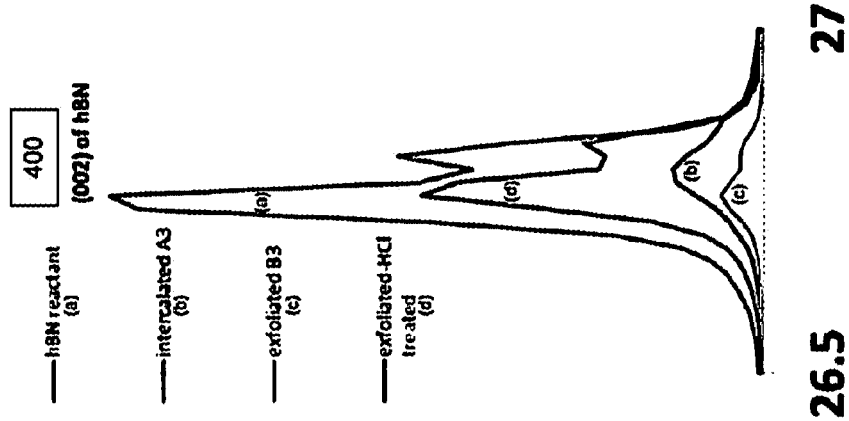

FIG. 4 illustrates XRD scans of hBN reactant, and A3, B3, and B3-HCl (as described in FIG. 3). Even though the very large (002) peaks were obtained, analyzing the implications of this XRD peak heights (or its total integrated intensity) is complicated because measured peak values are affected by many parameters, some of which are either not well known or difficult to control, such as chemical composition and preferred orientation of the samples being measured. Consequently, the XRD peak height were not closely examined other than the general observations that hBN's (002) peak heights were reduced during intercalation, and were mostly restored after the subsequent exfoliation reactions by 750° C. air and cleaning by HCl. This is illustrated in 400, which shows the relative heights of (002) peaks from thin samples of hBN reactant, A3, B3 and B3-HCl described in FIG. 3. The full XRD scans of these four samples are shown in 410, 420, 430, and 440. In these figures, no chemicals other than hBN were detected in the original hBN and the final product after HCl cleaning (B3-HCl in FIG. 3). In the intercalated sample (410), the major intercalate (iron chlorides) are not visible and are believed to be amorphous, but small impurity peaks of FeOCl and NaCl were detected. After the intercalated samples were heated in 750° C. air, $Fe_2O_3$ (major intercalate) and NaCl were detected in 420. The presence of NaCl in A3 and B3 is believed to be the result of reactions of NaF and $FeCl_3$ at the environment of the intercalation reaction. The presence of FeOCl in A3 is caused by a trace of oxygen in the reaction system. The oxygen may come from water that remained in the once-distilled $FeCl_3$. It may also come from the reaction between NaF and the glass container. The presence of $Fe_2O_3$ is believed to be the oxidation product from $FeCl_3$ and FeOCl.

Hexagonal boron nitride is much less reactive than the intercalates which are generally more chemical reactive. By inserting reactive chemicals into the hBN layers, the atoms/molecules of the intercalated will be brought to the proximity of individual hBN layers, and the chemical properties of hBN may be affected. The possible changes of hBN's chemical properties can be probed by examining the FT-IR data.

Figure 5:
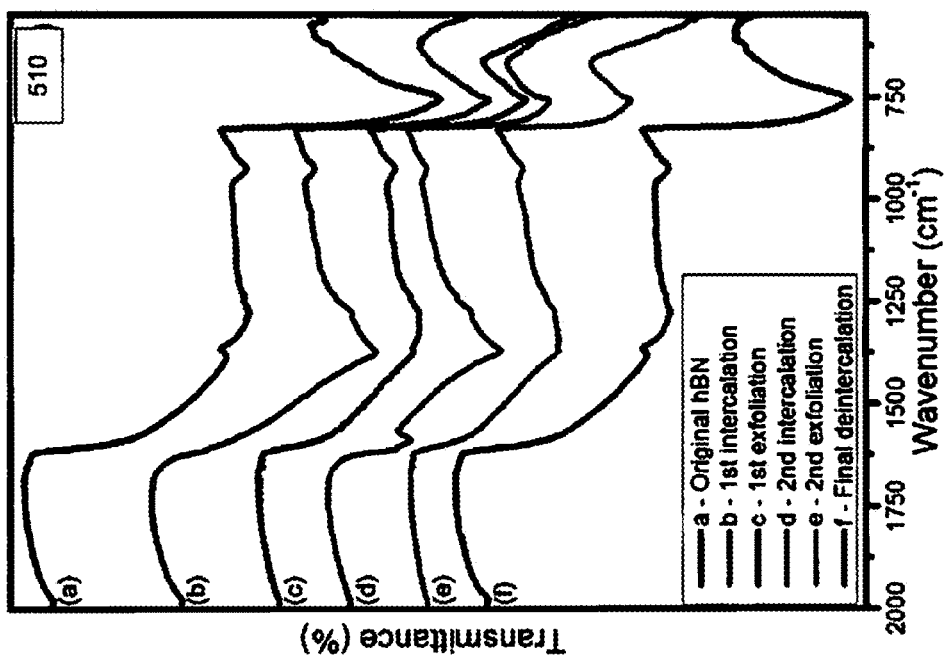
FIG. 5 illustrates changes of the Fourier transform infrared spectroscopy (FTIR) peaks from hBN to intercalation, exfoliation, and deintercalation.
Figure 5:
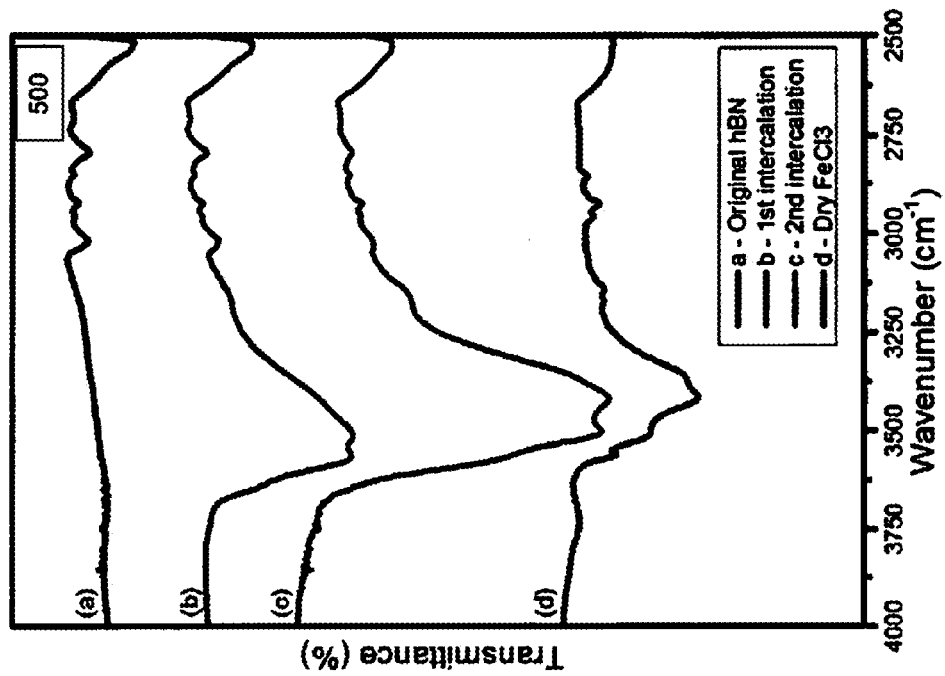

FIG. 5 illustrates changes of the FTIR peaks from hBN to intercalation, exfoliation, and deintercalation. Typically for h-BN, there are two characteristic peaks: a relatively broad band 1700-900 $cm^{-1}$, and a relatively narrow band 850-700 $cm^{-1}$, which are associated with the in-plane B—N bond stretching vibration and the out-of-plane B—N—B bending vibration, respectively. FTIR of hBN used in experiments discussed herein consistent with these data, as seen in curve a of 500. After reacting with $FeCl_3$, the product has a large and broad new FT-IR bands at 3050 to 3700 $cm^{-1}$ range which includes double bands at 3480 and 3555 $cm^{-1}$.

Graph 500 compares FT-IR of the original hBN (curve a), intercalated hBN containing $FeCl_3$ (curve b) and the pure $FeCl_3$ (curve c) at the broad bands wavenumber range (3000-3800 $cm^{-1}$). The original hBN does not have a band in this range, but the other two do. The broad band from the intercalated product is therefore thought to be the band from $FeCl_3$. However, these bands (curve b) positions and shapes were different from the pure $FeCl_3$ (curve c). The FT-IR differences between pure $FeCl_3$ and intercalated $FeCl_3$ indicate the intercalated $FeCl_3$ is affected by hBN. In other words, there are interactions between hBN and $FeCl_3$.

Graph 510 is the FT-IR data in 500-2000 $cm^{-1}$ region. It shows the shape changes of the broad hBN bands during the entire process. That is, from the original hBN reactant (curve a) it was sequentially treated by heating in a $FeCl_3$—NaF mixture for intercalation (curve b), heating in 750° C. air for exfoliation followed by rinsing in deionized water to removing NaCl (curve c), heating in $FeCl_3$—NaF mixture again for intercalation the $2^{nd}$ time (curve d), heating in 750° C. air for exfoliation followed by deionized water rinse for removing NaCl the $2^{nd}$ time (curve e), and finally placing in 35 wt % HCl to remove the intercalates (curve f).

For the broad 1700-900 cm$^{-1}$ band, its shapes changed during the intercalation-oxidation-deintercalation process. Peak position of this band shifted from 1277 to 1383 cm$^{-1}$ during the process (510, curve b, c, d and e), but returned to the original 1277 cm$^{-1}$ after all intercalates are removed (510, curve f). Changes of the 850-700 cm$^{-1}$ band, on the other hand, remained in the narrow 755 to 760 cm$^{-1}$ range. This suggests a change of the B—N stretching vibration, but not much change of the B—N—B bending vibration.

In addition to the above-described bands, new FT-IR peaks at about 1600 cm$^{-1}$ are observed in the intercalated samples (510, curves b and d). A close look shows they are double-peaks. One of them was from intercalate (FeCl$_3$), described in more detail below. The other was believed to be due to stretching in the direction comparable to BNNT's tangential stretching vibration. It is noted such peak does not show up in regular hBN, but showed up in BNNT because the tube curvature induces a strain on the hBN network. The observation of such band in the hBN sample here suggests strain on the hBN, possibility due to the presence of the intercalates in the hBN network. The band near 500 cm$^{-1}$ was believed to be from Fe$_2$O$_3$, which resulted from oxidation of FeCl$_3$.

Similar to the XRD data, all changes of the FT-IR data during the process were nearly completely reversed, and the peaks returned to the original shape after the final HCl treatment where the intercalates and other impurities were removed.

The overall changes of the hBN's vibration modes during the entire process indicates interactions between hBN and intercalate (hBN-FeCl$_3$ or hBN-Fe$_2$O$_3$) result in changes of hBN's chemical properties, and such changes can be reversed by removing the intercalates.

The mass ratio of the original reactant mixture was hBN:FeCl$_3$:NaF≈1:2:0.2. After heating the mixture of hBN (large platelets), FeCl$_3$ and NaF and then boiling off excess FeCl$_3$, the as-synthesized products were brown in color and had a mass gain over the original hBN by about 100%. Energy dispersive spectrum (EDS) obtained from SEM operated at 15 kV indicated that the overall mole ratio of Fe:Cl:Na for this as-synthesized product was about 1:2.8:0.45. It was noted that EDS cannot detect fluorine, which was in the original reactant in the form of NaF.

The significance of NaF in the reaction was observed when comparing the above mass data to those in preliminary experiments where the same heating and boiling process was conducted without the presence of NaF. In those cases, the as-made products were white in color and had mass gain over the original hBN by less than 10%.

Figure 6A:
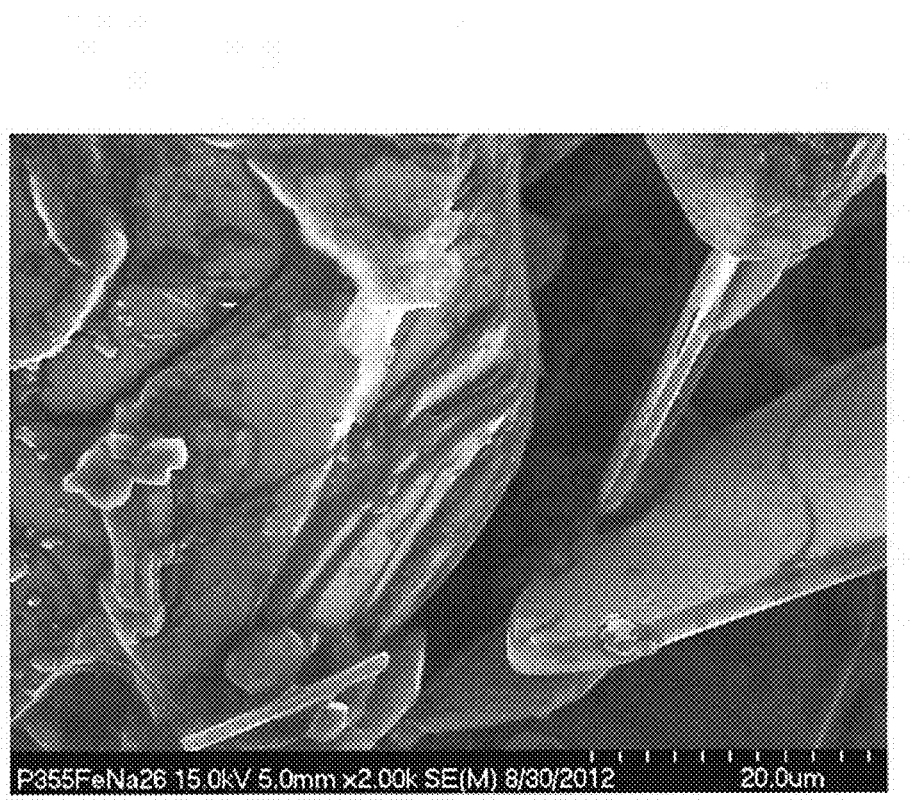
FIGS. 6A-B illustrate field emission scanning electron microscope (FESEM) images of hBN platelets with ferric chloride intercalate.
Figure 6B:
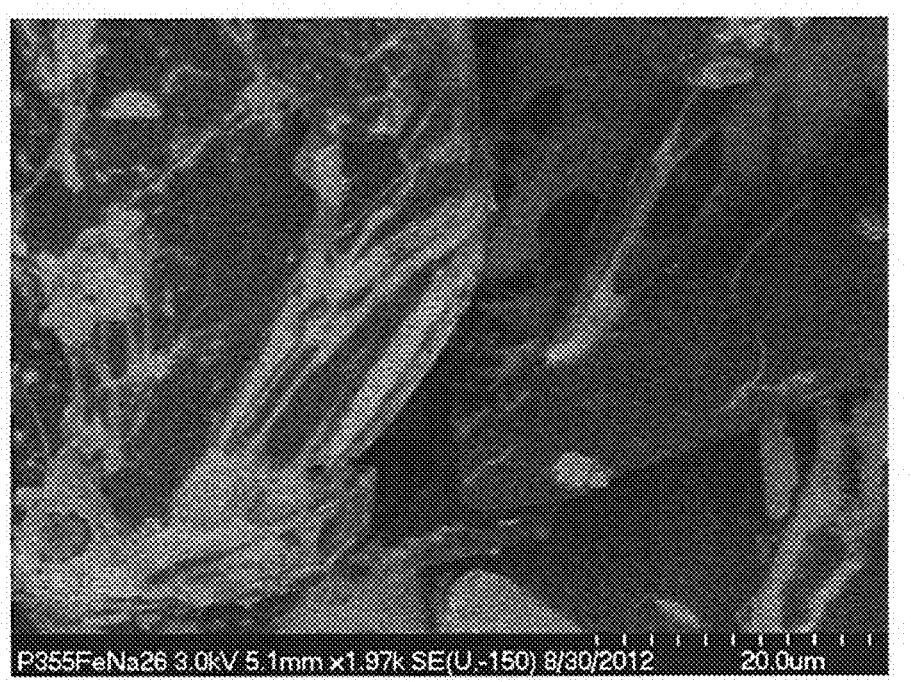

FIG. 6A shows an FeSEM photo of the as-synthesized product. FIG. 6 shows the same image of hBN platelets, except the SEM detected backscattered electrons, which highlights heavy element (iron) as bright areas. Comparing these two pictures, it can be seen that iron are concentrated more at the sides and edges of the disk-shaped particles. These data suggest that the mass increases during the reactions resulted from FeCl$_3$ entered the layered structures of the hBN from the side.

Figure 7A:
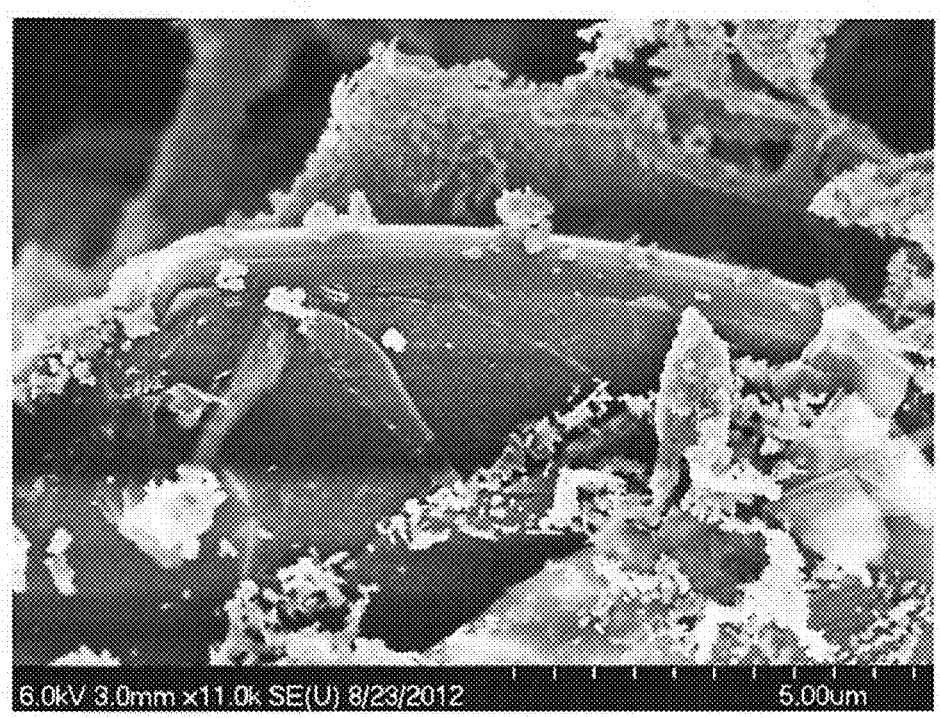
FIGS. 7A-B illustrate SEM pictures of an intercalated sample after it was slowly oxidized by oxygen in air at high temperature to become $Fe_2O_3$ nanoparticles.
Figure 7B:

FIGS. 7A-7B are SEM pictures of the above intercalated sample after it was slowly oxidized by oxygen in air at high temperature to become Fe$_2$O$_3$ nanoparticles (e.g., B1 in FIG. 3). The heating rate was 5° C. per minute from room temperature to 750° C. with a holding time of 2 hours at 300° C. It was sufficiently slow so that the iron chloride intercalate were in solid phase and did not change location when they became Fe$_2$O$_3$. The presence of Fe$_2$O$_3$ in the sample was confirmed by XRD. FIG. 7A shows top view of alternating layers of hBN and Fe$_2$O$_3$ nanoparticles. FIG. 7B is the side view of a relatively thick hBN layer about 1 μm thick. It can be seen that this layer is split into numerous thin layers about 20-30 nm thick. Both pictures suggest that hBN was intercalated with the nanoparticle's precursor (i.e., iron chloride).

Figure 8A:
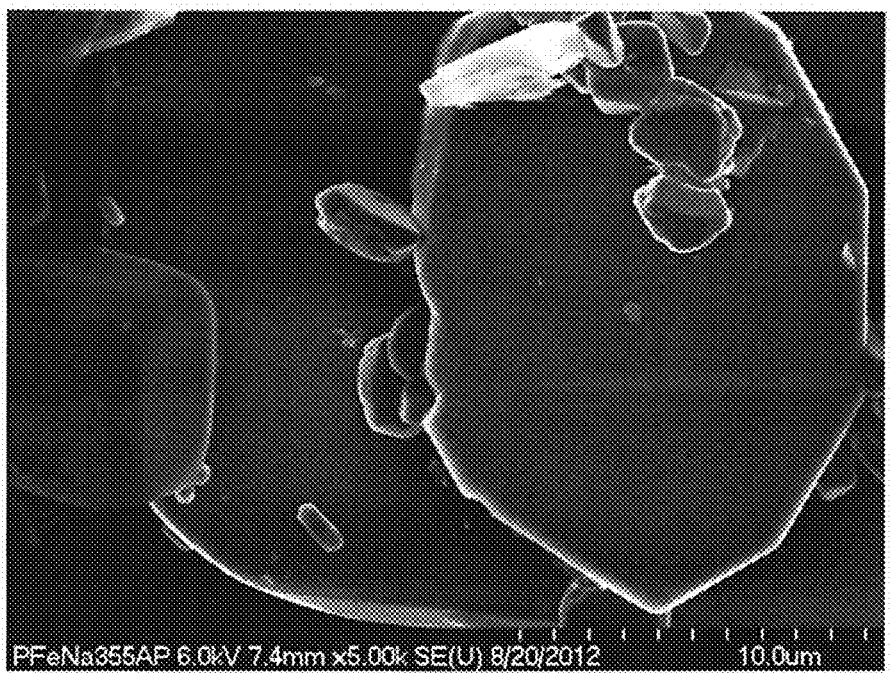
FIGS. 8A-B illustrate SEM pictures of an intercalated sample after it was quickly oxidized by oxygen in air at high temperature.
Figure 8B:
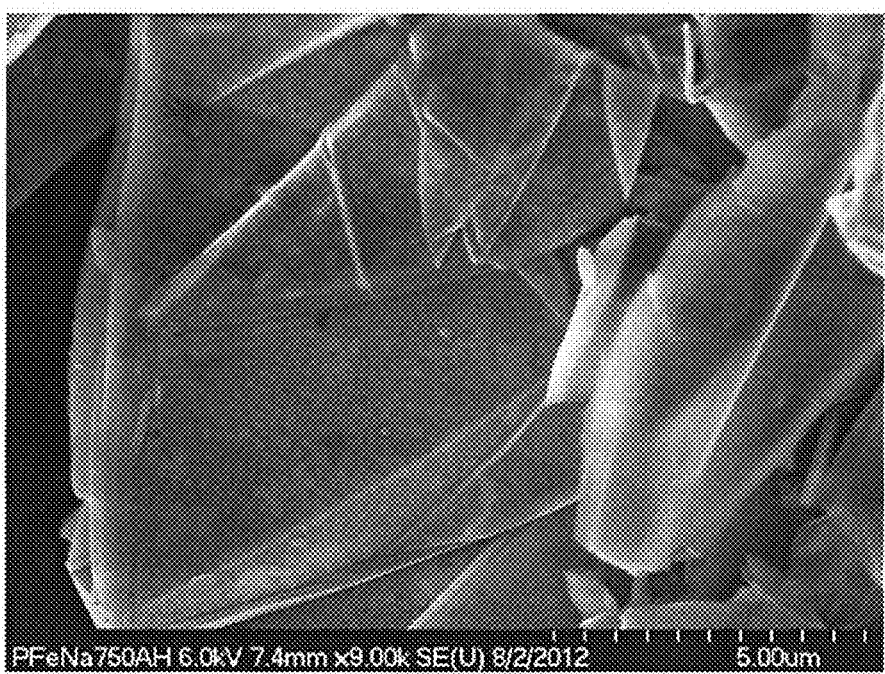

FIG. 8A is SEM photo from a sample similar to FIGS. 7A-7B, except this intercalated sample was quickly oxidized by placing it into the preheated 750° C. furnace (e.g., B2 in FIG. 3). The fewer but much larger, micron-sized Fe$_2$O$_3$ particles are believed to be the result that some FeCl$_3$ intercalates melt, coagulated, moved out of the lattice, and then oxidized. This sample also shows intercalation and a limited degree of exfoliation. FIG. 8B is a picture of exfoliated hBN in this sample.

The above pictures show signs that, using NaF as catalyst/activating agent, hBN was indeed intercalated with FeCl$_3$. Furthermore, subsequent heating of this intercalated product in air at 750° C. appeared to result in some degree of exfoliation. However, the exfoliation shown in both FIG. 6B and FIG. 7B was the minority among a large number of platelets in the samples. Although 20 nm exfoliation thicknesses were found, some platelets were not exfoliated, and the thicknesses of most of the exfoliated hBN platelets were in 0.5 to 2 μm range. Nevertheless, the resulting platelets were overall thinner than the original hBN reactant platelets (mostly more than 5 μm thick), but far from the goal of fabricating "white graphene." For the purpose of generating further exfoliation, reactions (3) to (7) described earlier in this report were carried out via two different techniques.

Figure 9A:
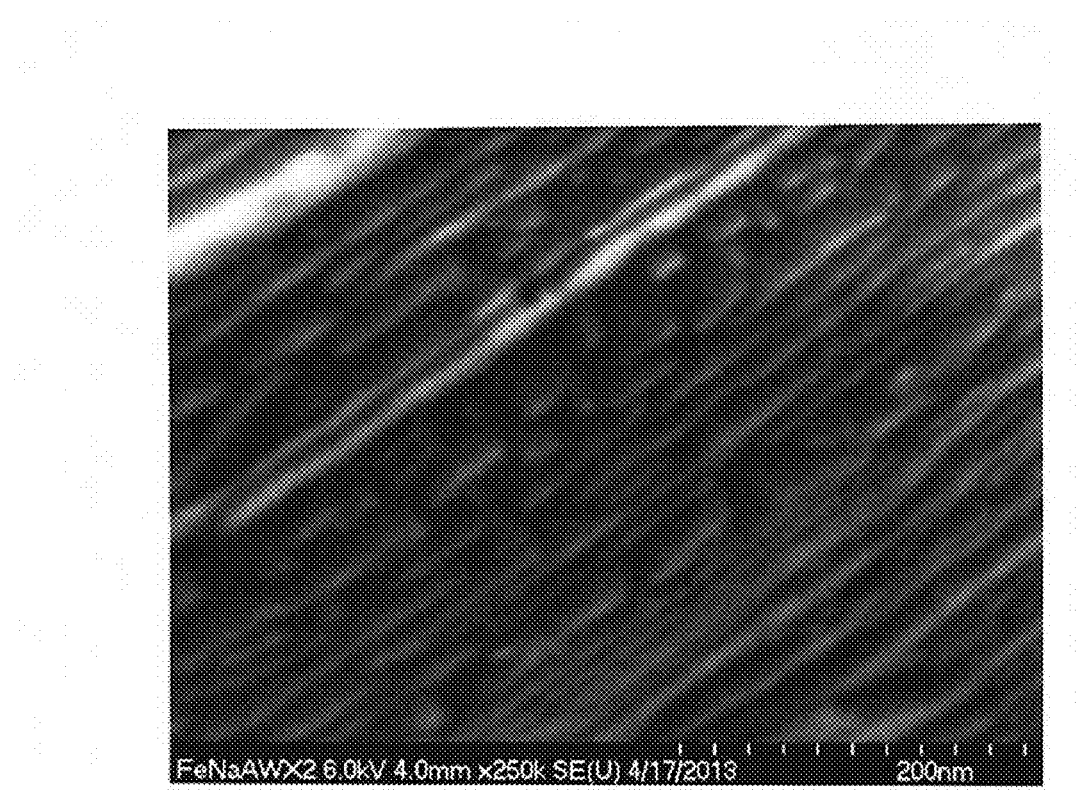
FIGS. 9A-B illustrate SEM images of exfoliated hBN nanosheets.

In the first technique, the intercalated and then air-heated product (hBN containing micron-sized Fe$_2$O$_3$ particles described in connection with FIGS. 8A-8B) was rinsed with water to remove its sodium content (EDS data), intercalated (mixed with FeCl$_3$ and NaF and heated) and exfoliated (heated in 750° C. air) for the second time, and then cleaned (placed in 35 wt % HCl). The result showed more complete and much more pronounced exfoliation where 20 nm nanosheets of pure hBN and pores can commonly be seen, as shown in FIG. 9A. This result also demonstrates that, with additional cycles of intercalation and exfoliation, more extensive exfoliation into even thinner nanosheets is possible.

In the second technique, the hBN was intercalated and exfoliated for the second time in a way similar to the first technique, except the intermediate intercalated product was placed in ambient air for 50 hours before it was exfoliated for the second time in 750° C. preheated furnace, and the sample was covered by a quartz lid during the subsequent 750° C. heating to exfoliate the sample for the second time.

Figure 9B:
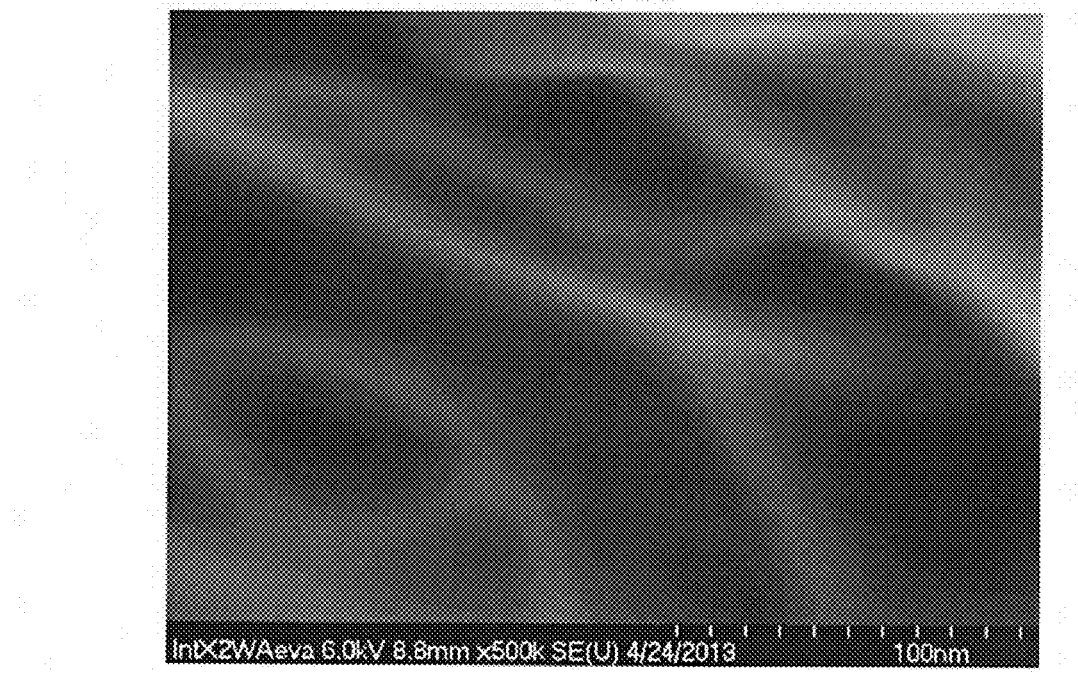

Ambient air (about 30% relative humidity) exposure caused the hygroscopic intercalated hBN to adsorb water of around 10% of its own mass. The subsequent 750° C. heating caused the water and then FeCl$_3$ to quickly boil, resulting in exfoliation and producing steam that carried away some exfoliated BN layers. These BN layers were then deposited on the quartz lid and, after the system was cooled to room temperature, picked up by a piece of carbon tape for SEM examination. SEM pictures show they were piles of nanosheets, about 10-20 nm thick and separated by a space of about 10-60 nm, such as that seen in FIG. 9B.

Exfoliation of hBN, as observed in experiments discussed herein, suggests that the original hBN was intercalated; additional exfoliation after repeating the same process further supports this suggestion.

The apparent enhancement of exfoliation after the hygroscopic intercalated compound picked up moisture in air called for additional study on the reactions between the intercalated compound and water. In a preliminary test, an intercalated sample A3, described in Table 1, was exposed to the ambient environment (24° C., 59-63% relative humidity) overnight after it was stored in dry air for 23 days. This resulted in 20% mass increase. The XRD data indicates that its c lattice parameter and hBN (002) peak width (FWHM) changed from 6.6584 Å and 0.059° to 6.6569 Å and 0.056°, respectively, during the overnight ambient air exposure.

A more detailed study of the effects of moisture in air on the same intercalated hBN was conducted after it was stored in dry air for 4-5 months. In this study, samples were exposed to room temperature air at different relative humidity and analyzed using 3 different methods (mass, FT-IR and XRD).

Figure 10:
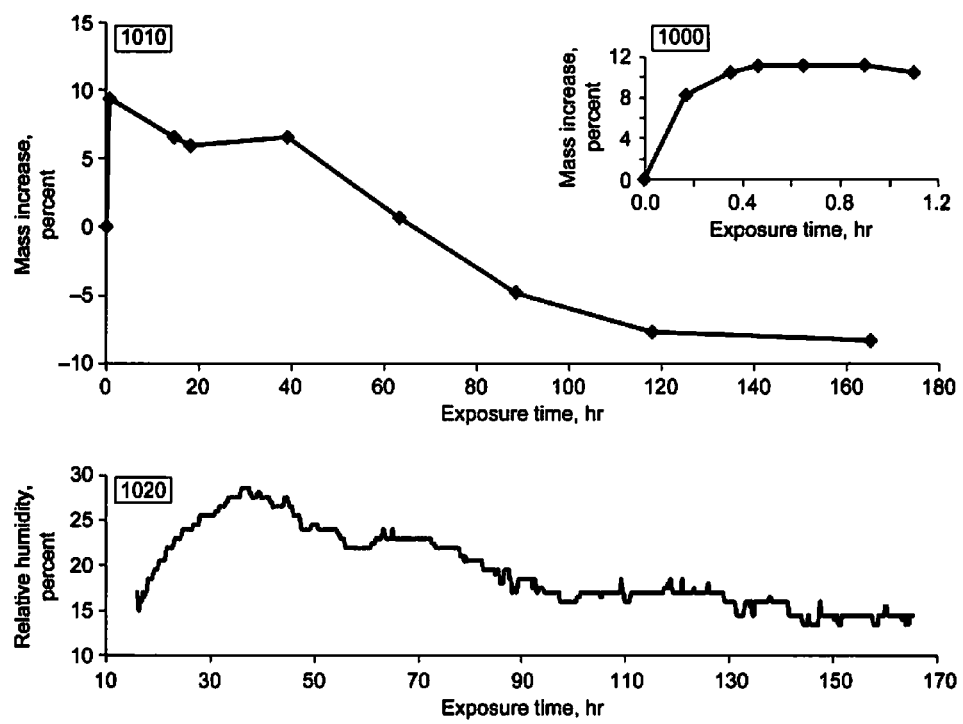
FIG. 10 shows the percent mass increase of two intercalated samples during the ambient air exposure.

FIG. 10 shows the percent mass increase of two intercalated samples during the ambient air exposure. One of them was weighed several times during an exposure time of 66 minutes (1000). The relative humidity was 26-27% during the time of this experiment. The result shows the sample mass increased rapidly during the first 20 minutes and reached a peak in 30-40 minutes of exposure time, to 11% mass gain. The other sample was tested similarly, but during a long exposure time of 165 hours (1010). The relative humidity histogram was also shown (1020). It was in the 15-28% range. It can be seen that after the mass reached a peak value within an hour, it began to decrease continuously for days during the ambient air exposure. Despite the initial mass increase, the overall mass during this ambient air exposure experiment actually decreased. The data suggests that the samples picked up moisture from air quickly. The moisture then reacted with intercalates, resulting in gas products, possibly HCl or $Cl_2$ during the conversion of $FeCl_3$ to $Fe_2O_3$.

For XRD analysis, a sample of the same product (A3 in Table 1) was mounted and filled in a 0.5 mm-deep well ZBH holder and scanned for XRD 12 times during an 85 hours period of ambient air exposure. All of the 12 datasets were obtained from a 10°-90° scan followed by high resolution scans of the (002), (004), (006), and (008) peaks. The sample surface turned dark, but remained intact during data acquisition.

Table 2 shows the 12 datasets of lattice parameter "c", the (002) width (FWHM), and the relative (002) peak height acquired during the course of the 85 hours of ambient air exposure. These values were obtained from the XRD data scanned at 0.005° per step. The "c" lattice parameter and the FWHM relative accuracy were estimated to be, respectively, 0.0002 Å and 0.002° with these scans which were longer in duration and to higher angles than data previously discussed. It can be seen that both the height and the width of the (002) peak continue to decrease throughout the process, indicating a decrease of the crystalline content in the sample. It appears that water absorbed by (and possibly intercalated into) the sample, causing some crystallites to become amorphous, and the reaction would continue for several days or more.

TABLE 2 c parameter, (002) peak width and (002) peak height of an intercalated hBN A3 (Table 1 and FIG. 2) in 85 hrs during which a sample was exposed to the ambient air. The humidity histogram of the air is included. The sample had been stored in dry air for 123 days at the beginning of this experiment. Error is estimated to be ±0.0002 Å for lattice parameters and ±0.002° for FWHM values.

| XRD scanning dataset | Total ambient exposure time at the beginning and the end of the scanning (hr) | | relative humidity at the beginning and the end of the scanning (%) | | Lattice Parameter from the scanning dataset c (Å) | FWHM from the scanning dataset (deg) | Relative (002) peak height |
|---|---|---|---|---|---|---|---|
| | beginning | end | beginning | end | | | |
| Pure hBN reactant | — | — | — | — | 6.6585 | 0.014 | — |
| 1 | 0.03 | 2.2 | 15 | 16 | 6.6585 | 0.064 | 1.00 |
| 2 | 2.2 | 4.3 | 16 | 17 | 6.6581 | 0.066 | 0.90 |
| 3 | 4.3 | 6.4 | 17 | 18.5 | 6.6580 | 0.066 | 0.89 |
| 4 | 6.4 | 8.6 | 18.5 | 20.5 | 6.6579 | 0.066 | 0.88 |
| 5 | 13.6 | 19.4 | 25.5 | 17.5 | 6.6579 | 0.065 | 0.88 |
| 6 | 24.4 | 30.2 | 14.5 | 14.5 | 6.6579 | 0.062 | 0.84 |
| 7 | 35.2 | 41.1 | 13.5 | 13.5 | 6.6578 | 0.058 | 0.80 |
| 8 | 46.0 | 51.9 | 11 | 13.5 | 6.6582 | 0.053 | 0.74 |
| 9 | 56.9 | 62.7 | 11.5 | 12.5 | 6.6579 | 0.05 | 0.67 |
| 10 | 67.7 | 73.5 | 11 | 13.5 | 6.6579 | 0.047 | 0.61 |
| 11 | 73.6 | 79.4 | 13.5 | 22.5 | 6.6582 | 0.047 | 0.59 |
| 12 | 79.4 | 85.3 | 22.5 | 31 | 6.6582 | 0.048 | 0.58 |

At the beginning, the c parameter was in a decreasing trend. This trend appeared to be leveled at about 40 hrs of ambient air exposure. This suggests that, among the crystallites in the sample, the hBN crystallites that did not became amorphous during this process of humid air exposure are those with smaller c parameter (and therefore smaller interplanar spacing).

Figure 11:
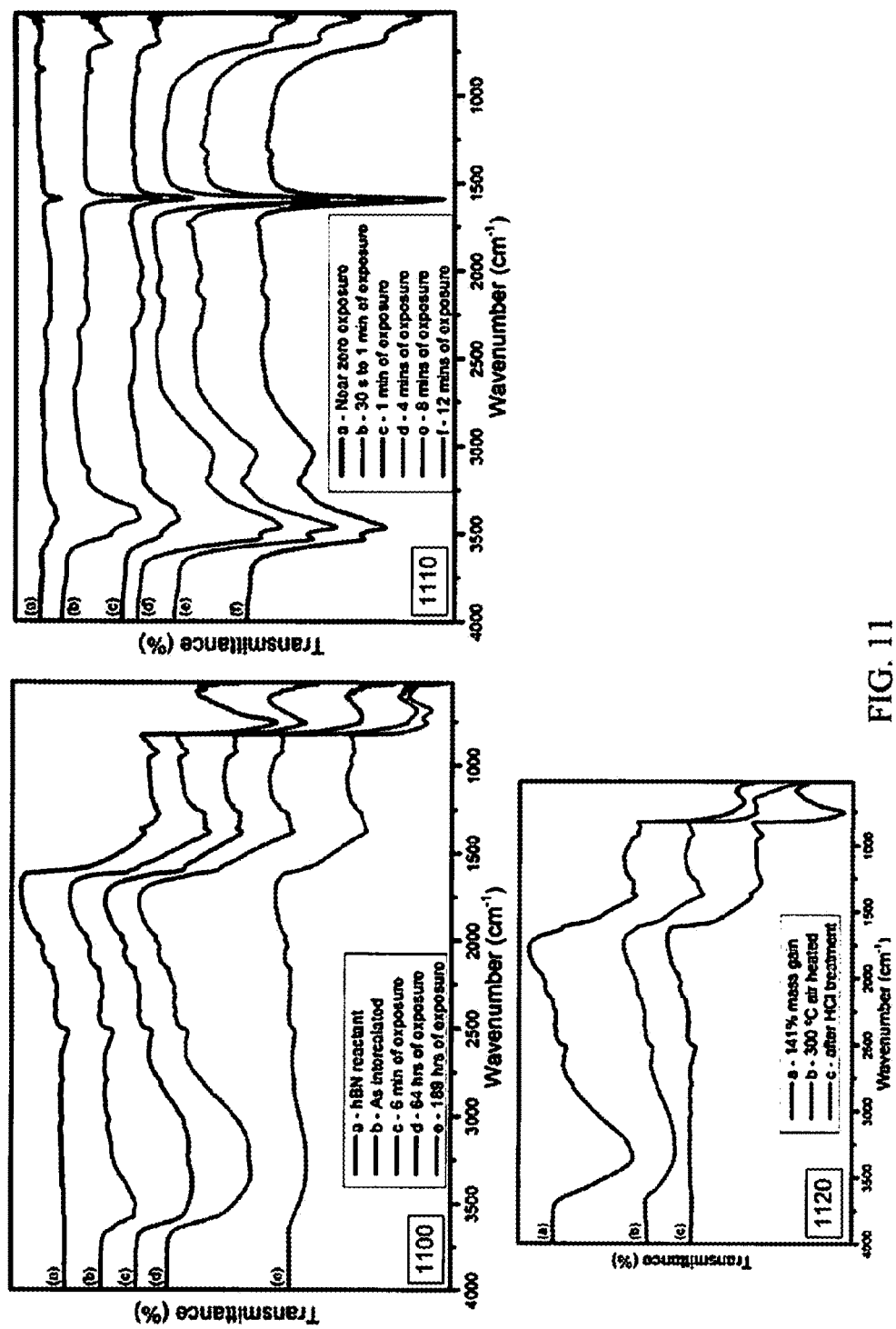
FIG. 11 shows FT-IR of an intercalated product, exposed to ambient air at 15-30% relative humidity for 6 minutes, 64 hrs. and 189 hrs (top left); FTIR of distilled $FeCl_3$ during 12 minutes of air exposure at 44% humidity (top right); and $FeCl_3$ intercalated hBN after sequential treatment of 24 hours air exposure at 100% humidity (141% mass gain), 2 hrs 300° C. air, and 24 hrs room temperature 35 wt % HCl (bottom).

FIG. 11 shows the FT-IR of the same intercalated product (A3 in Table 1), exposed to ambient air at 15-30% relative humidity for 6 minutes, 64 hrs. and 189 hrs., respectively, at 1100. For comparison, the FT-IR of the original hBN reactant and the intercalated product before the ambient air exposure are also included in 1100, and FT-IR of dry (distilled) and wet (ambient-air-exposed) $FeCl_3$ are shown in 1110.

1100 shows the intercalated hBN has 5 prominent FT-IR bands: 750, 1250, 1370, 1600 $cm^{-1}$ bands and a broad 2700-3700 $cm^{-1}$ band. The 1250 and 1370 $cm^{-1}$ bands do not seem to be affected by moisture absorption when exposed to ambient air. The other three bands, on the other hand, have changes in shape/position/size as the intercalated hBN absorb moisture during ambient air exposure. Comparing to these five bands, 1110 shows pure $FeCl_3$ hBN has three prominent FT-IR bands, all of them changes during moisture absorption, and all of them are near the wavenumbers of the three bands in 1100 that changes during moisture absorption. It is therefore believed that the FT-IR changes for the intercalated hBN resulted from moisture absorption, as seen in 1100, are due to the interaction between water and the intercalated $FeCl_3$.

Furthermore, it is observed that the shape/position/size of the three bands in 1100 that changes during moisture absorption have noticeable differences from the three prominent bands in 1110. Their change patterns during moisture absorption were also different. This indicates intercalated $FeCl_3$ is not the same as pure $FeCl_3$, and suggests the possibility that there are interactions between hBN and $FeCl_3$, and their interactions change during moisture absorption.

The double-band near 1600 $cm^{-1}$ (described earlier as the peaks for strained hBN layers and $FeCl_3$, respectively) was again observed in the FT-IR of the intercalated hBN without hydration (curve b of 1100). The fact that this double-band became single after the sample begin to pick up moisture suggests water causes the intercalated $FeCl_3$ to re-arrange during hydration, and hence reduces the internal stress/strain.

After 189 hours of ambient air exposure, both hydration-related bands (2700-3700 $cm^{-1}$ and 757 $cm^{-1}$) were reduced, but the 1280-1380 $cm^{-1}$ band, which was not effected by hydration, still did not change much. It appears that water caused some reactions and consequently was consumed. However, no new compounds were detected by FT-IR or XRD during this period.

To further study the effects of water, a new intercalated product (A4 in Table 1) was exposed to 100% relative humidity, room temperature air for 24 hours to gain as much water as possible. The fully hydrated product gained 141% mass and became viscous, paste-like. It was further treated in 300° C. air for 3 hours, and eventually in 35 wt % HCl for 24 hours to remove all intercalates. 1120 shows its FT-IR data and FTIR data of the products obtained during this process. The large quantity of water mass increase was reflected by the complete overlap of the hBN's 760 $cm^{-1}$ band and the hydrated $FeCl_3$'s 679 $cm^{-1}$ band. The water was tightly bounded to the product, as the large and broad water-related 2700-3700 $cm^{-1}$ band could not be completely removed during the subsequent 300° C. air heating. On the other hand, both the intercalation effects and the hydration effects were completely reversed to the states of the original reactant after the final HCl treatment to remove all intercalate.

In summary, upon exposing the hBN intercalated with ferric chloride to ambient air, it adsorbed moisture in air quickly between one or two hours. The moisture in the sample is in the form of iron chloride hydrate (FT-IR data) and is likely to be in the hBN layers (XRD data). The amount of moisture adsorbed depends on the humidity of the air. Data in this research showed 11% mass gain at room temperature and 26-27% relative humidity. Upon continuous ambient air exposure, water in the sample is believed to cause some reactions and consequently was consumed. If the ambient air is close to 100% humidity, the changes are similar in trend, but are extreme. In that case the adsorbed water was measured to be 141% of the dry mass. During ambient air exposure, the lattice structures change, but are not irreversibly destroyed, as the original hBN's FTIR data can be largely restored by treating this product in 35 wt % HCl.

A sample of an intercalated product (A3 in Table 1) was scanned for XRD immediately after it was synthesized. Two samples of the same product were stored in dry air for 23 days and 185 days, respectively, and then scanned. Table 3 shows the lattice c parameter and the peak width resulted from these three scans. It appears that the intercalated hBN underwent a slow change in dry air. The mass data, however, shows the changes in the chemical compositions during this period were within the experimental error.

TABLE 3 c parameter and (002) peak width of an intercalated hBN A3 (Table 1 and FIG. 2) measure at three different storage times during which the samples were in dry air. The samples were prepared in ambient air for about 5 minutes before XRD scanning. Error estimated to be ± 0.0005 Å for lattice parameters and ± 0.01° for FWHM values.

| XRD scanning dataset | Storage time (days) | Lattice Parameter from the scanning dataset c (Å) | FWHM from the scanning dataset (deg) |
|---|---|---|---|
| Pure hBN reactant | — | 6.6585 | 0.01 |
| 1 | 0 | 6.6565 | 0.05 |
| 2 | 23 | 6.6584 | 0.06 |
| 3 | 123 | 6.6585 | 0.06 |

Figure 12:
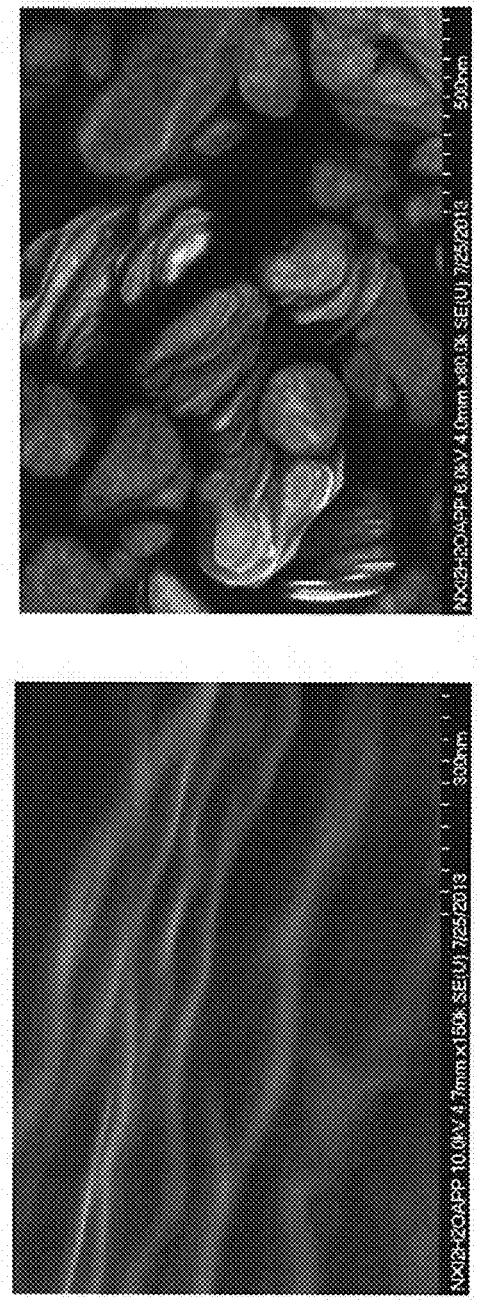
FIG. 12 illustrates an exfoliated sample resulting from small hBN platelets intercalated and then hydrated in 100% relative humidity.

For additional exfoliation, more water can be added into the intercalated products, the intercalated-hydrated product can be heated to higher temperature at higher rate, and more cycles of intercalation-hydration-heating can be conducted for exfoliation. In addition, smaller platelets, with fewer layers and less area to split, may exfoliate more extensively than the larger ones. To test these suggestions, the intercalated small platelet hBN (A5 in Table 1) was exfoliated, rinsed, intercalated again, hydrated, exfoliated again, and then rinsed with HCl according to reactions (2), (3), (6), (7) and (5). For high heating rate, the exfoliation was conducted by heating the sample at 750° C. where both the furnace and the sample holder were preheated. For high degree of hydration, the sample was placed in 100% relative humidity environment for 7.5 hours, resulting in 36.4% mass gain. The final product, seen in the three images of FIG. 12, was the most extensively exfoliated so far in this research. Observing from the FeSEM operated at 6 KV, all hBN platelets that can be examined for exfoliation show that the exfoliated layers are about 20 nm thick or less.

Figure 13:
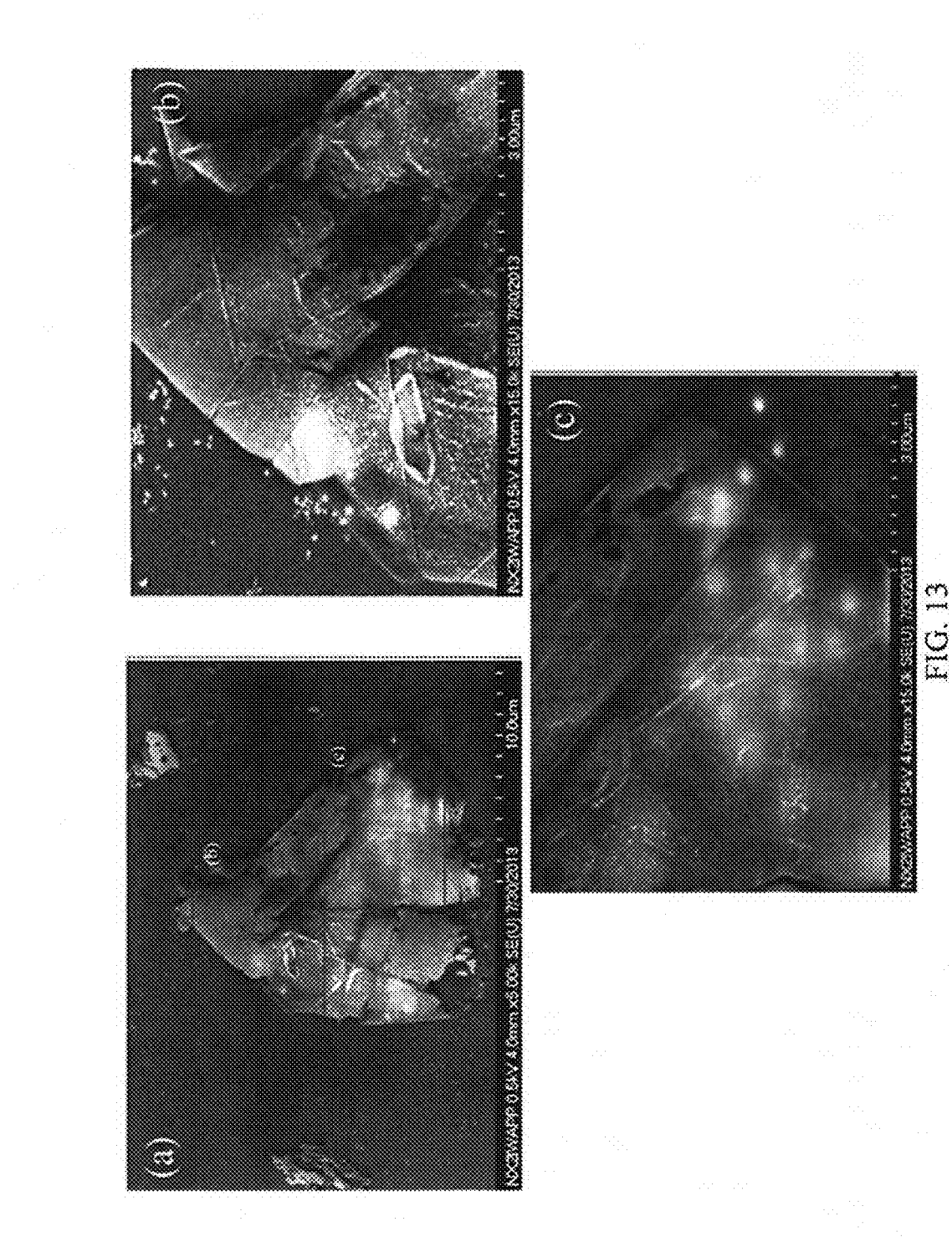
FIG. 13 illustrates a top view of an image of an exfoliated platelet, obtained by SEM operated at 0.5 KV, showing semi-transparent layers of hBN.

Using carbon adhesive tape, a sample was peeled and examined under FeSEM at 0.5 KV. The top view of an exfoliated platelet, seen in FIG. 13, showed multiple semi-transparent layers. Based on the Kanaya-Okayama penetration depth formula, the total thickness of the multiple semi-transparent layers need to be less than 5.5 nm in order to let the 0.5 KV electrons give them a semi-transparent appearance (Let the average atomic weight (A) be 12.5, atomic number (Z) be 6, and density ($\rho$) be 2 $gm/cm^3$ in the formula $H=0.0276 A V^{1.67}/(Z^{0.89}\rho)$, for the hBN, where H and V are penetration depth in μm and voltage in KV, respectively. The electron need to travel through the layers, hit the subject underneath, and travel through the layers back to be detected in order to give the layers a semi-transparent appearance in SEM photo.).

Producing even thinner exfoliated layers or nanosheets can be achieved with additional cycles of intercalation/exfoliation.

In summary, the first experiment involved treating a mixture of hBN, $FeCl_3$ and NaF at 290-355° C. in nitrogen environment, and examining the resulting product. The changes of the lattice parameter, the widening of the hBN (002) peak in XRD, the shape/size changes of hBN's peak in FT-IR at 1383 $cm^{-1}$ and 1277 $cm^{-1}$, the appearing of new FT-IR peaks at 2700-3700 and 1600 $cm^{-1}$, the mass increase data, the observed iron distribution in pictures and EDS of SEM, and the fact that the hBN can be exfoliated to 20 nm after treating this product to 750° C. heating, collectively make a strong case that $FeCl_3$ was located between the hBN layers in this product. In other word, the hBN was likely intercalated with $FeCl_3$. The fact that these changes were extended, and exfoliation was enhanced after the product adsorb moisture from air suggest the adsorbed water was also intercalated into the hBN layers.

The shape changes of hBN's broad FT-IR band (peaked at 1277 $cm^{-1}$) and the appearing of the new band at 1600 $cm^{-1}$ were observed. The new FT-IR band at 2700-3700 is similar to pure $FeCl_3$'s FT-IR band at the same wavenumber range. However, some of their differences suggest the intercalated $FeCl_3$ is different from the pure one, and there are hBN-$FeCl_3$ interactions in the intercalated product. Overall, the FT-IR data suggests a change in hBN's chemical properties. In various embodiments of the subject innovation, these new chemical properties can be employed to make products such as composites with special electrical, thermal and mechanical properties.

In various embodiments, intercalates other than $FeCl_3$ can be used. This can include $AlCl_3$, $CuCl_2$, $MoCl_5$, $SnCk_4$ (and other metal chlorides), and many others that either are known intercalates for carbon or can be wetted by hBN at their molten states. It is to be appreciated that the examples provided herein are for purposes of illustration, and not to limit the scope of the innovation. In various embodiments, selected chemicals for intercalation can include most any of those discussed herein.

Variations and combinations of the reactions (1) to (7) can result in a large number of different intermediate and final products. An example of the "variations and combinations" of the chemicals and chemical reactions is described in connection with a second set of experiments, where exfoliated hBN containing aluminum oxide was produced. Some of the nanosized aluminum oxide particles were seen to be between the exfoliated BN layers.

Although one example (reactions (8) through (16)) is provided below, multiple variations can result in aluminum oxide dispersed in exfoliated boron nitride. Additionally, hot pressing of this product of aluminum oxide dispersed in exfoliated boron nitride at 1500-2000 C can result in a ceramic composite that is a highly thermally conductive electrical insulator. In accordance with various aspects, the subject innovation can comprise aluminum oxide intercalated in boron nitride, dispersed in exfoliated boron nitride, or a ceramic composite formed from the same.

Below are example series of reactions (8)-(16) used in connection with the second experiment that can produce aluminum oxide dispersed in exfoliated boron nitride in accordance with aspects of the subject innovation:

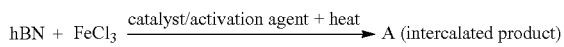
(8)

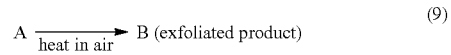
(9)

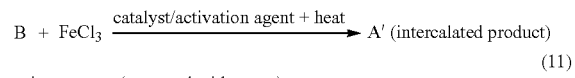
(10)

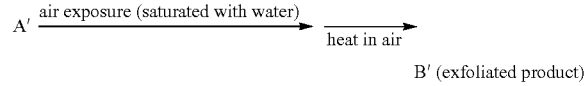
(11)

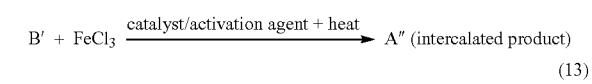
(12)

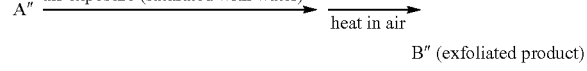
(13)

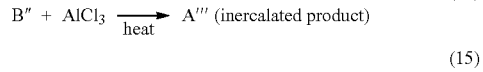
(14)

(15)

$A''' \xrightarrow{\text{heat in air}} B'''$ (exfoliated product)

(16)

Figure 14:
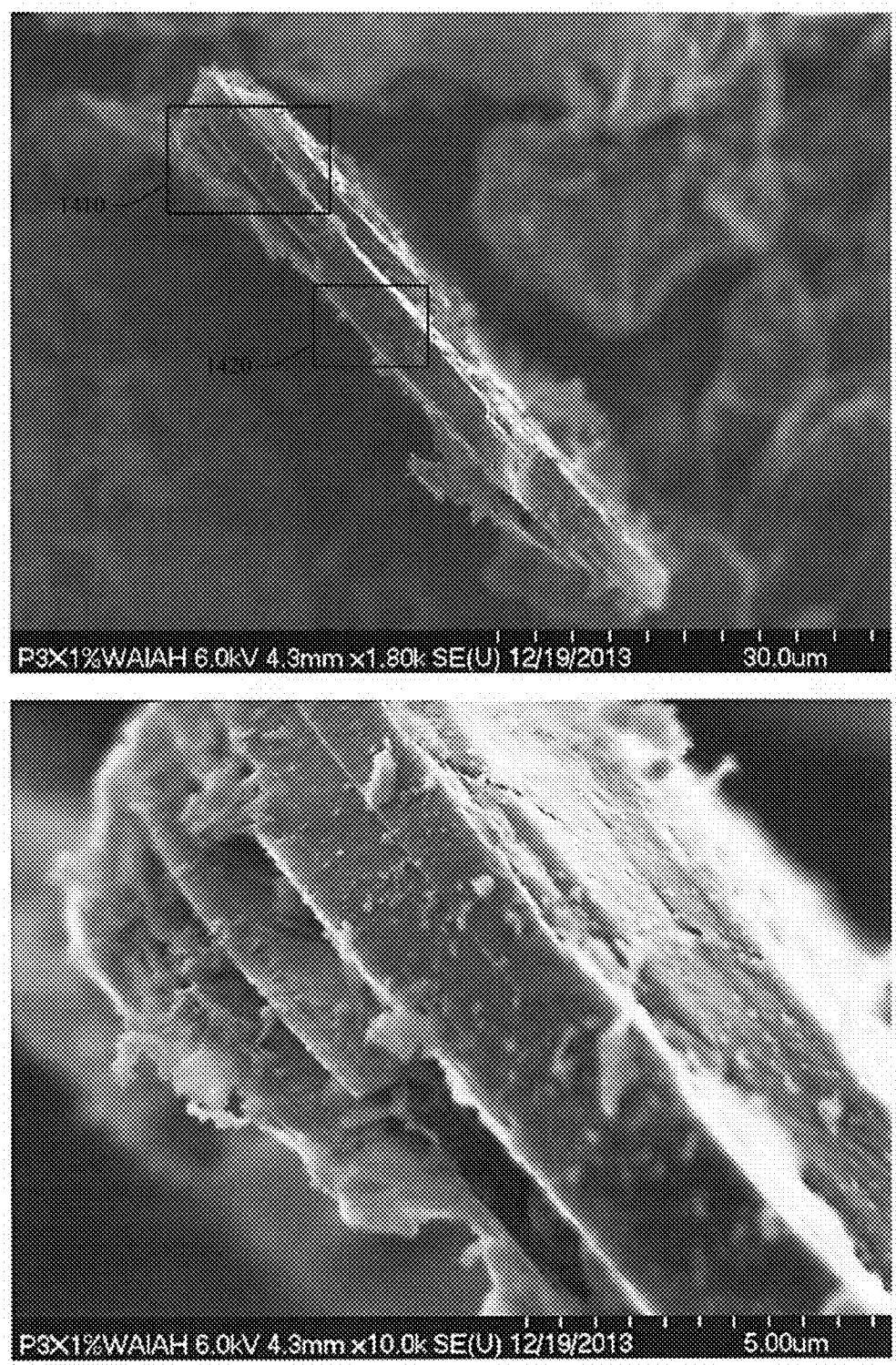
FIG. 14 illustrates SEM images of an exfoliated product containing aluminum oxide.
Figure 15:
FIG. 15 illustrates additional SEM images of an exfoliated product containing aluminum oxide.

In the example experiments conducted in connection with reactions (8) through (16), the catalyst was NaF. The heat during intercalation with $FeCl_3$ was in nitrogen at 250-400° C. range, and the heat during intercalation with $AlCl_3$ was in nitrogen at 130-240° C. range. The heat in air during exfoliation was done by placing samples (with sample holder at room temperature) in a furnace that was preheated to 750° C. Air exposure with saturated water vapor was done at room temperature, where samples were in a closed container containing some liquid water. B, B' and B" above were BN containing iron oxide, and B' was BN containing aluminum oxide and iron oxide. Because HCl dissolves iron oxide, but not aluminum oxide, the iron oxide was removed during (16), but the aluminum oxide remained. FIG. 14 shows two SEM images of the final product E, with the second image corresponding to the boxed region 1410 in the upper image; FIG. 15 shows two additional images of the final product, with the upper image corresponding to the boxed region 1420 of FIG. 14, and the lower image corresponding to the boxed region 1510. The lower image of FIG. 15 is a backscattered picture that shows aluminum as bright and BN as dark, and also shows the BN's exfoliate layers that cannot be seen in the top image of FIG. 14. The dispersed aluminum oxide within the BN layer can be clearly seen in the lower image of FIG. 15.

In another portion of the second set of experiments, the following reactions were used to create hBN with an aluminum oxide coating:

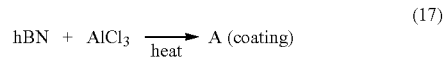
(17)

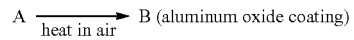
(18)

The heat with $AlCl_3$ was in nitrogen at 130-240° C. range, and the heat in air during exfoliation was done by placing samples (with sample holder at room temperature) in a furnace that was preheated to 750° C. The AlCl$_3$ contained water (0-5% mass) in the experiment that gave the product (BN with aluminum oxide coating).

Figure 16:
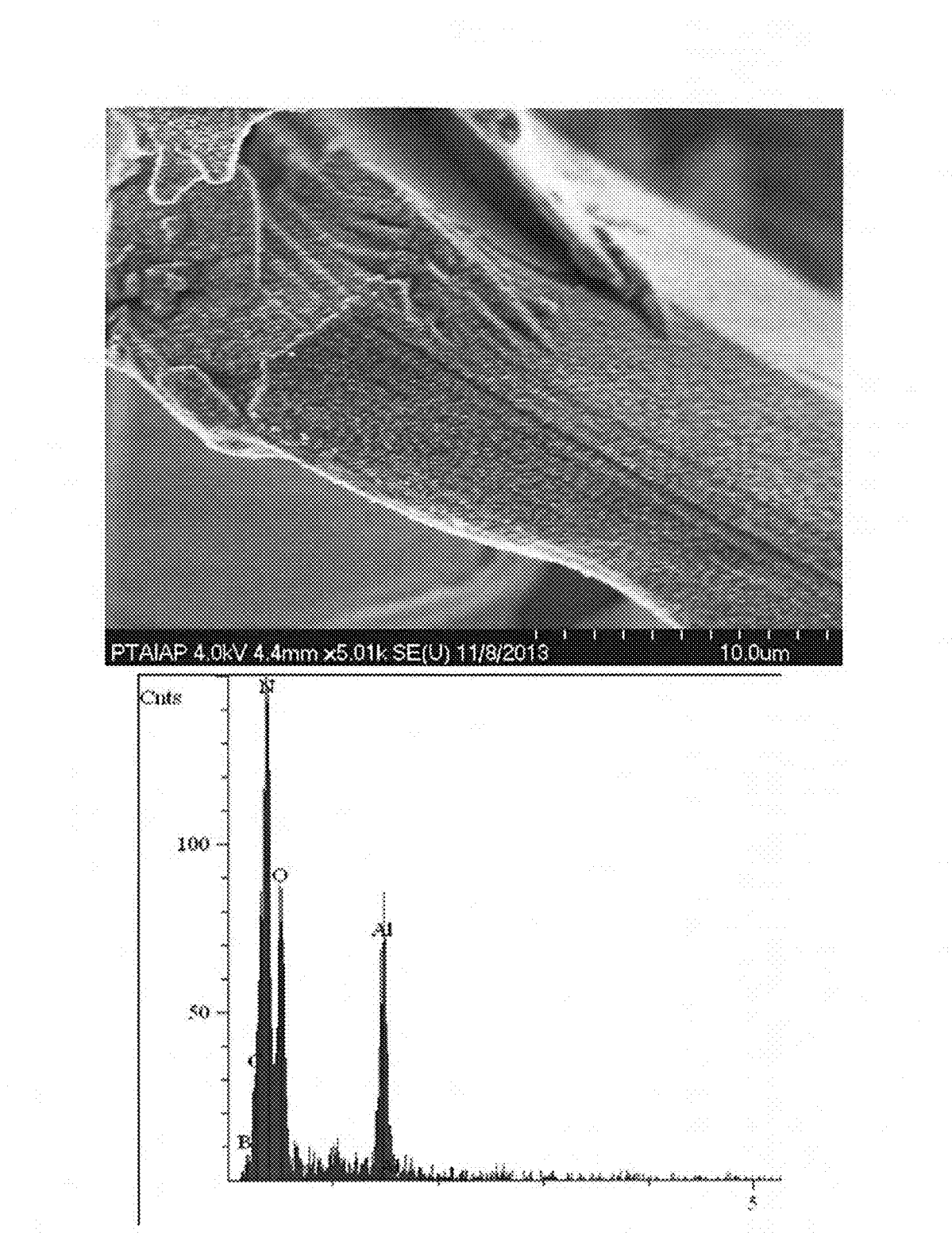
FIG. 16 shows an SEM of nanosized aluminum oxide coating on hBN, top, and an EDS (Energy-dispersive X-ray spectroscopy) graph showing the coating is aluminum oxide.
Figure 17:
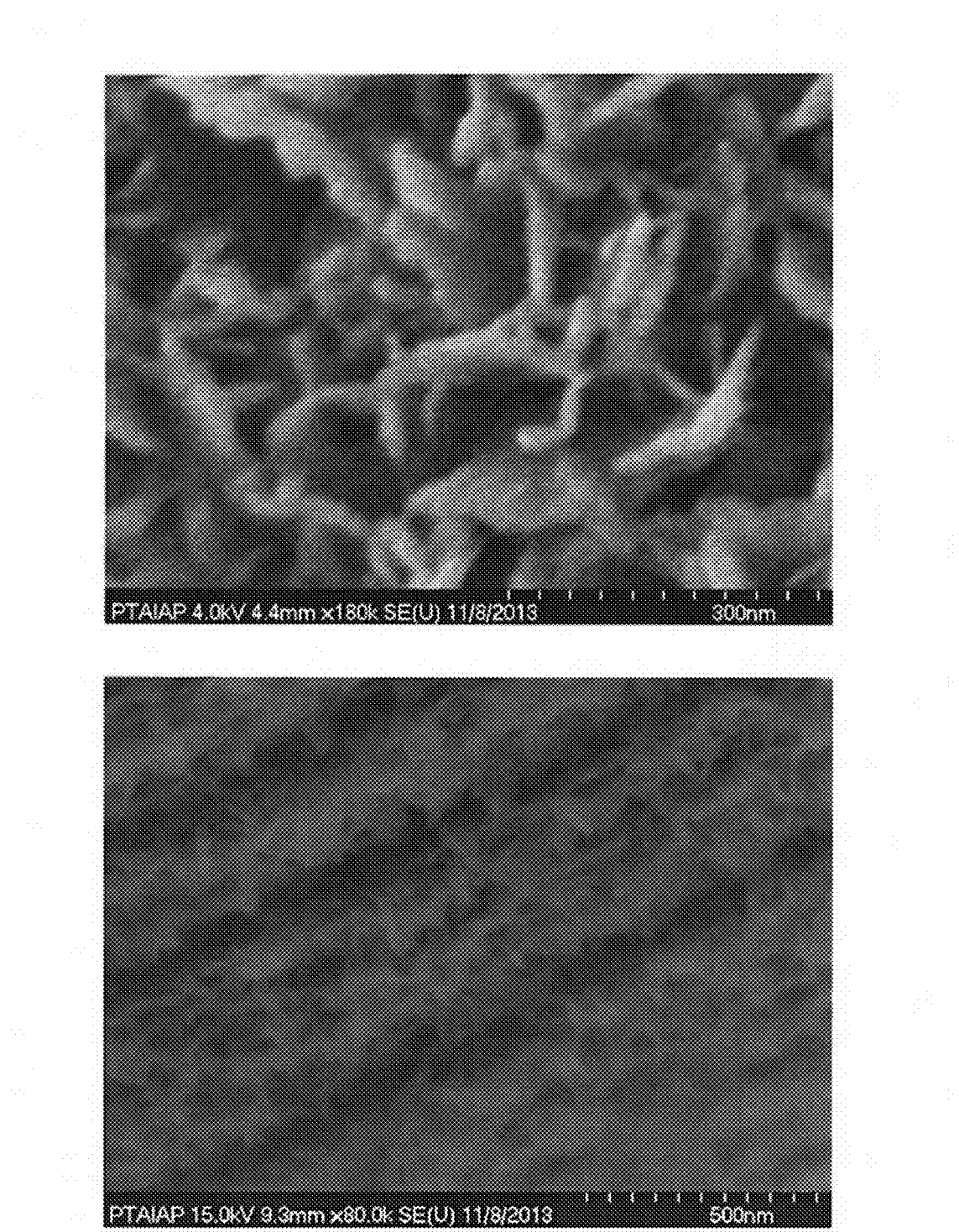
FIG. 17 shows two additional SEM images of the nanosized aluminum oxide coating on hBN.

FIG. 16 shows an SEM of nanosized aluminum oxide coating on hBN, top, and an EDS (Energy-dispersive X-ray spectroscopy) graph showing the coating is aluminum oxide. FIG. 17 shows two additional SEM images of the nanosized aluminum oxide coating on hBN, a top view (above) and a side view (below).

In a third set of experiments, intercalation and exfoliation of MoCl$_5$ in hBN was explored, partly to test and demonstrate the range of intercalates that can be used with hBN, and partly to produce material useable to create boron nitride-molybdenum-oxygen nanocomposite articles. The following reactions were used in these experiments:

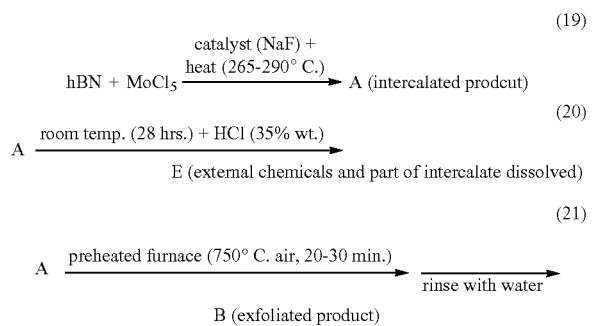

Figure 18:
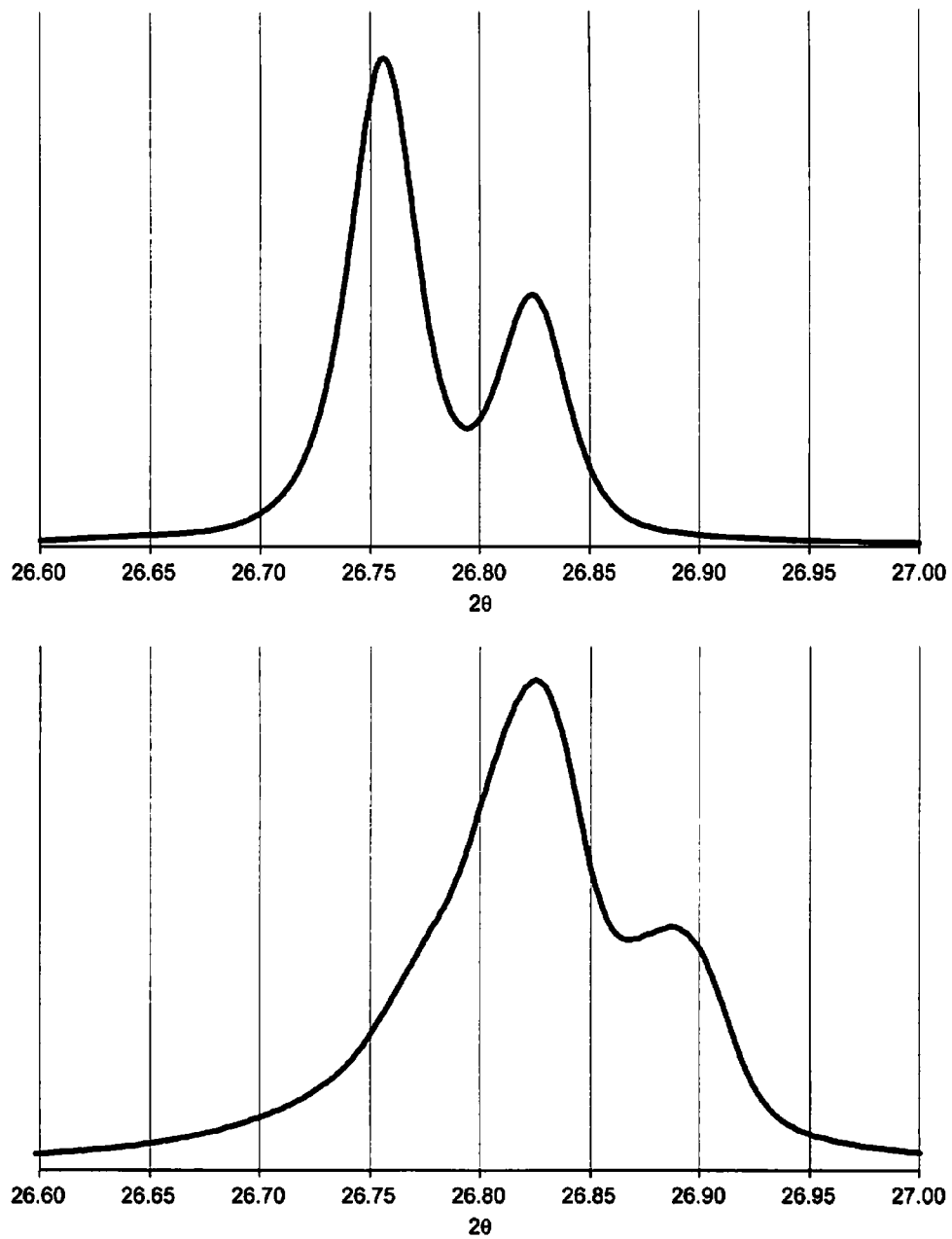
FIG. 18 shows XRD graphs of an original sample of hBN and molybdenum pentoxide intercalated hBN.

Starting from a sample of large hBN particles (20-80 μm wide and 5-10 μm thick platelets), the molecular structure of the product A (in reactions (19)-(21)) changed so significantly that the x-ray diffraction (XRD) (002) peak position shift and peak width increase can be visually observed in FIG. 18, showing the original hBN in the upper graph, and the product A in the lower graph. Exfoliation of a platelet (in product E in the above formula) can be observed in the SEM images in FIG. 19. The upper image shows the MoCl$_5$ intercalated hBN after HCl treatment, showing some layer split even before normal exfoliation treatment. Backscattered electrons were used for this image; the brighter regions contain more molybdenum and less boron nitride and the darker regions contains contain less molybdenum and more boron nitride.

Figure 19:
FIG. 19 shows SEM images of an exfoliated platelet made by molybdenum pentoxide intercalation and heating molybdenum pentoxide intercalated hBN in air.

Starting from a sample of small hBN particles (200-800 nm wide 80-200 nm thick platelets), the lower SEM image in FIG. 19 shows the product B (in the above formula) was exfoliated to 10 nm or less. It is noted that this product ("B" in reaction (21)) was nearly pure by energy dispersive spectrum (EDS). Apparently, rapid heating at 750° C. air caused almost all of the molybdenum chloride to be evaporated before it could be oxidized. This is unlike iron chloride or aluminum chloride, both of which were mostly oxidized under the same condition before they could be evaporated.

Figure 20:
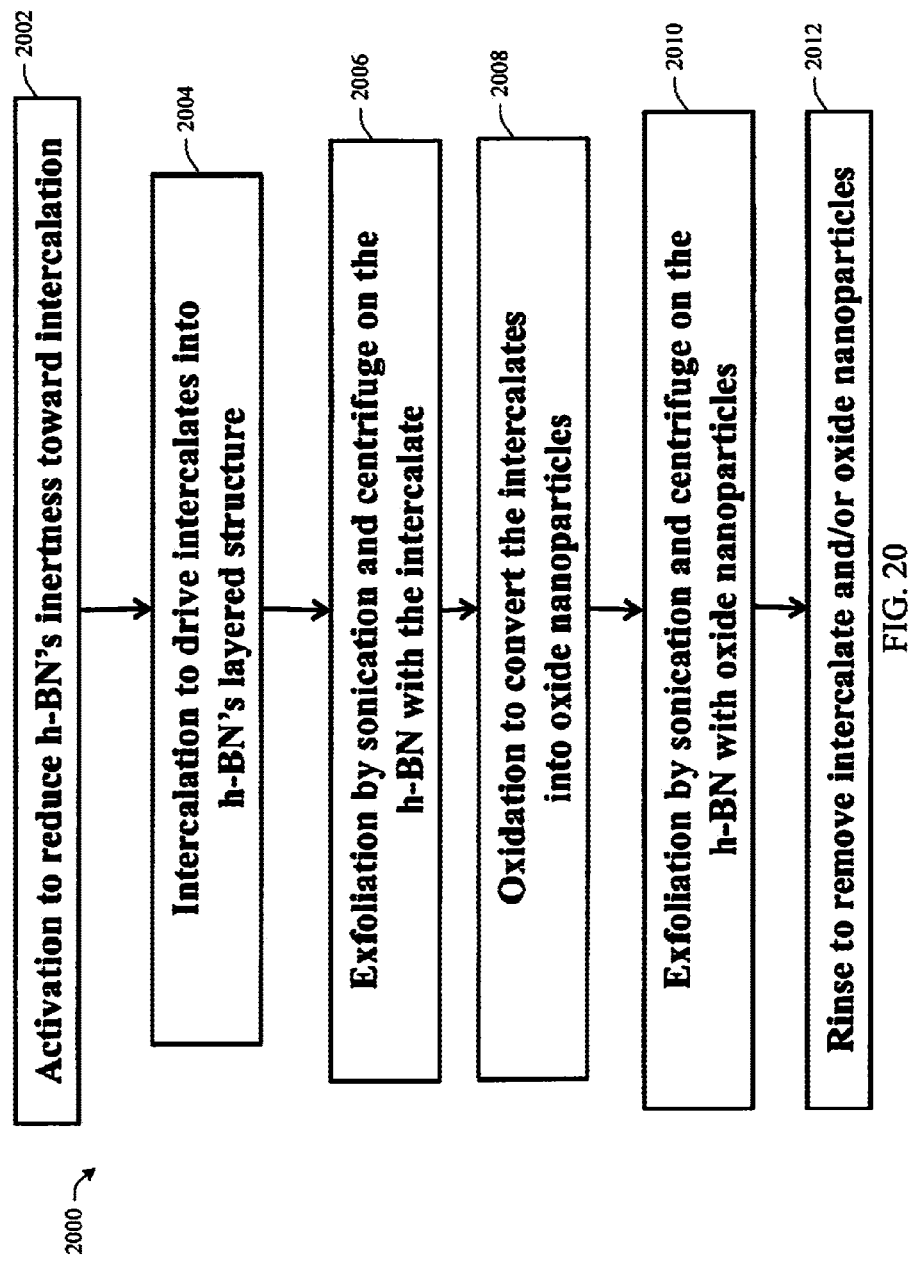
FIG. 20 illustrates a method of intercalation and exfoliation of hBN employed in connection with a set of experiments discussed herein.
Figure 21:
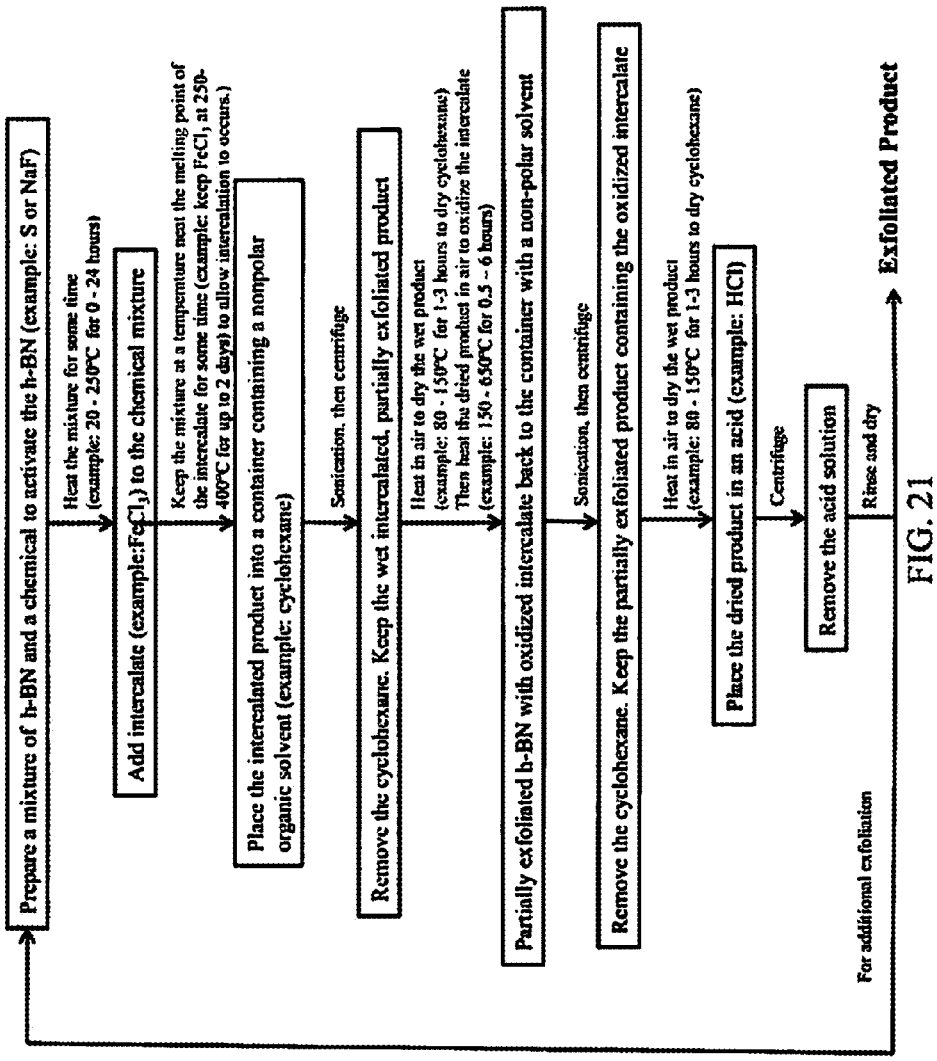
FIG. 21 illustrates another method employed for intercalation and exfoliation in connection with experiments discussed herein.

FIG. 20 illustrates a method 2000 of intercalation and exfoliation of hBN employed in connection with a fourth set of experiments. The method can begin at 2002 with activating a sample of hBN (e.g., with NaF, S, etc.) to reduce its inertness toward intercalation. At 2004, the method can continue with intercalating the hBN with one or more intercalates, such as the metal chlorides discussed herein (e.g., iron, aluminum, molybdenum, etc.), for example, by heating the hBN, activating agent, and material selected for intercalation for a first period of time (e.g., at a temperature and for a time that can depend at least on the material selected for intercalation, as described above). Next, at 2006, the intercalated hBN can be exfoliated, such as by rapid heating, sonication, etc. At 2008, the intercalates can be oxidized to convert them to oxide nanoparticles, and at 2010, further exfoliation can be employed (e.g., as described herein, etc.), followed at 2012 by rinsing the exfoliated material to remove intercalate and oxide nanoparticles. FIG. 21 illustrates another method 2100 that was employed for intercalation and exfoliation in connection with experiments discussed below.

In the fourth set of experiments, hBN was intercalated with FeCl$_3$, and then exfoliated via sonication. Although sonication was used in this set of experiments, and heating used in those listed above, in various embodiments, heating, sonication, etc., or any combination thereof can be employed. A mixture of highly crystallized commercial hBN (about 20-80 μm in diameter and 5-20 μm thick), NaF and FeCl$_3$ was placed in a tube. The mass ratio of these three chemicals was 1:0.12:2.7, respectively. The mixture was heated to 315° C. for about 12 hours and then 340° C. for 2 hours. Since the boiling point of FeCl$_3$ is 315° C., the excess FeCl$_3$ was evaporated from the sample. The product was approximately 180% of the original boron nitride mass, and was brownish yellow in color.

Figure 22:
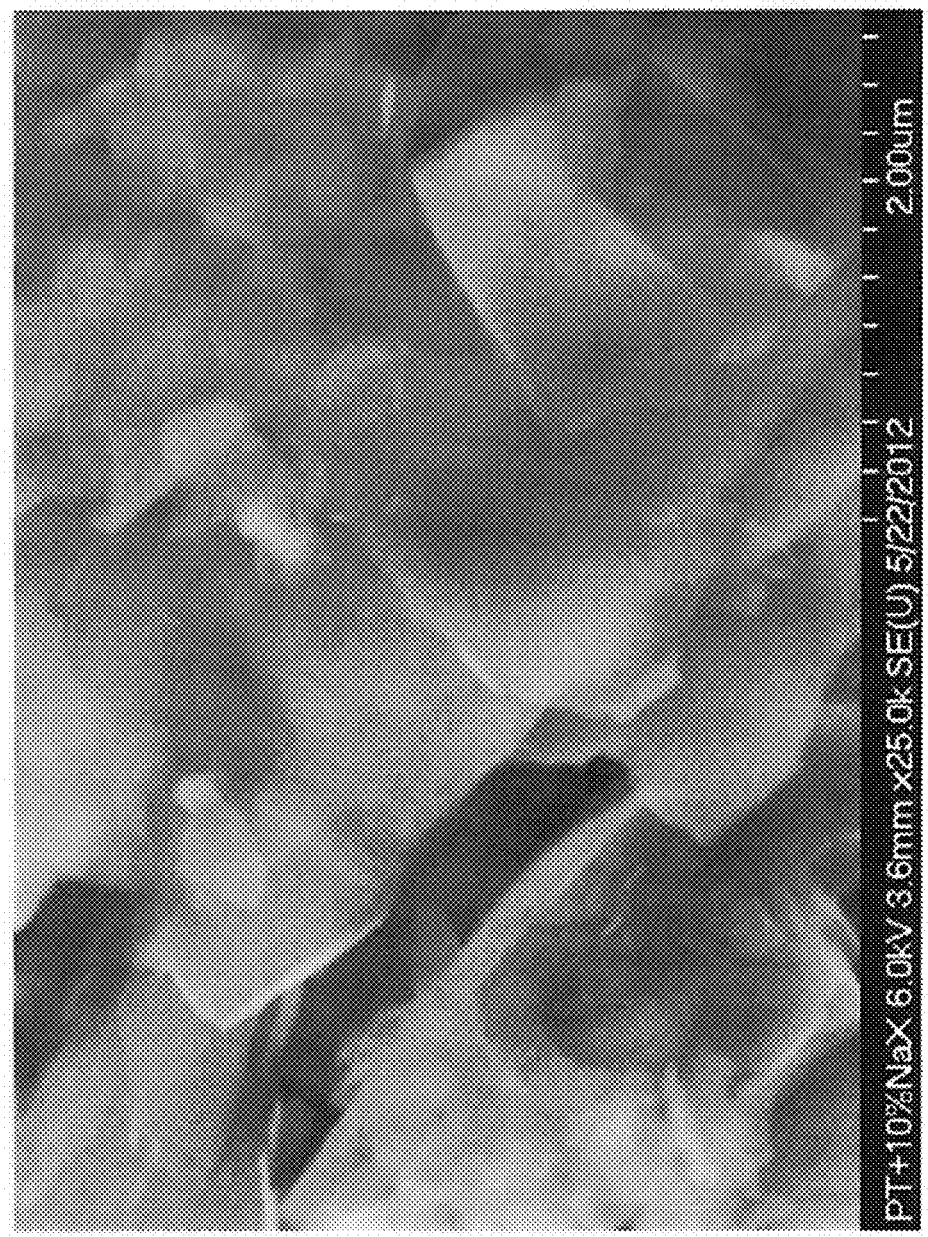
FIG. 22 illustrates an SEM picture of a final product of this process, in which exfoliation of hBN can be seen.
Figure 23:
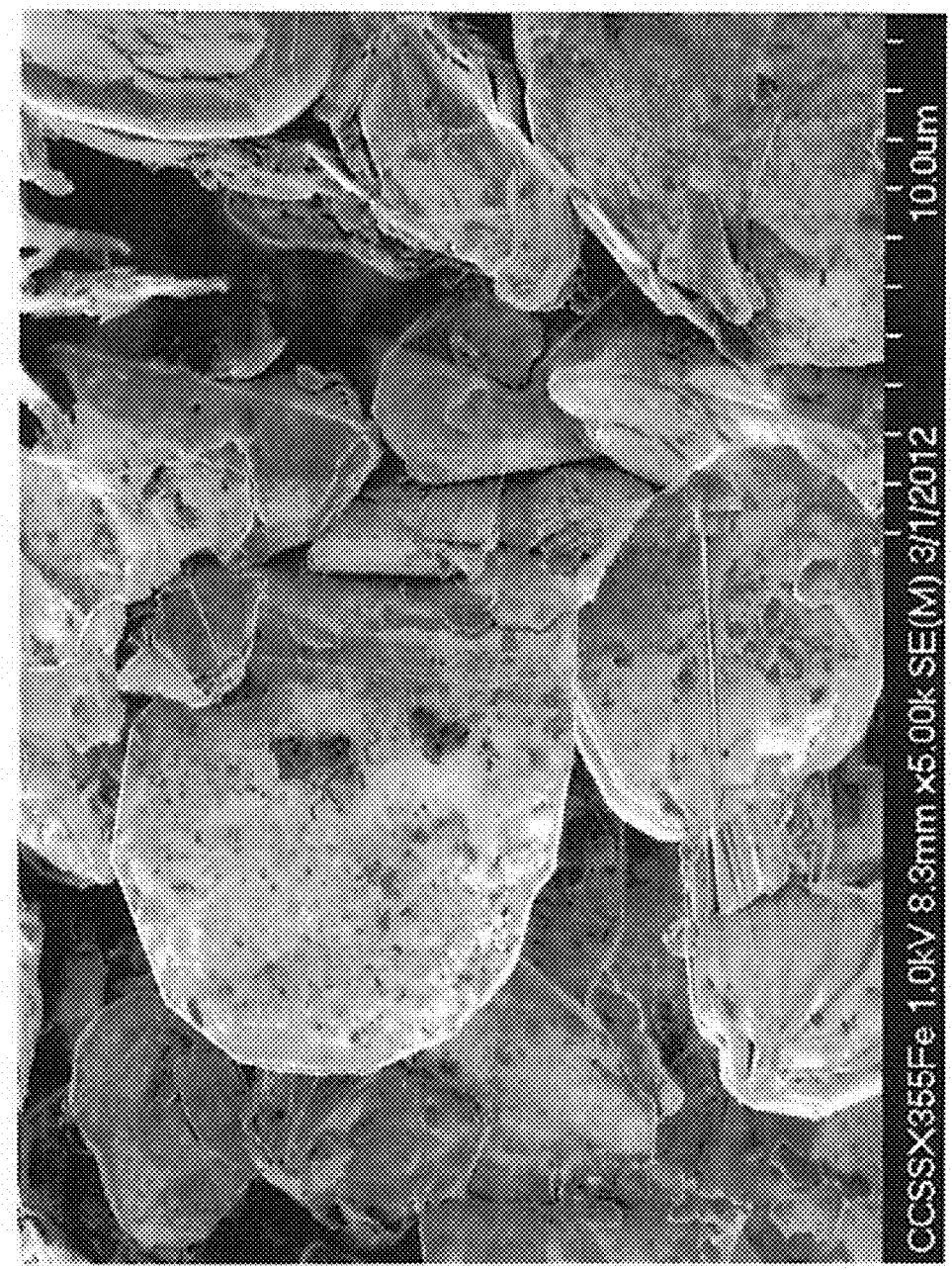
FIG. 23 illustrates an SEM image at 1 kV showing some BN layers that were semi-transparent or almost invisible.

The intercalated product (A1 in Table 1) was sequentially treated for the purpose of exfoliation (i.e., split the boron nitride layers) by removing the inserted chemicals (i.e., deintercalation, where intercalates exit the boron nitride layers). This was done as follows: (1) sonicated in C$_6$H$_{12}$ for 6 hours, then centrifuged at an acceleration of 2250 times that of gravity (i.e., 2250G); (2) dried and heated in 150° C. air; (3) sonicated in C$_6$H$_{12}$ again for 6 hours, centrifuged under the acceleration of 2250G, dried; (4) heated in 450° C. air for 5.5 hours; (5) sonicated in C$_6$H$_{12}$ for a third time for 6 hours, centrifuged under the acceleration of 2250G, dried; and (6) rinsed in HCl and water. After this series of treatment, the sample became white in color. EDS data from SEM's energy dispersive spectrum showed in contained only boron and nitrogen, indicating complete removal of the inserted chemicals. The XRD for samples at different stages of this series of treatments showed that the overall XRD changes during the entire series of treatments was narrower peaks for (002) and (100), larger peaks for (002) with the changes of (001) peak heights complicated but not obvious. Overall, this indicated changes of boron nitride lattice structure during the removal of the non-boron nitride chemicals. FIG. 22 shows an SEM picture of a final product of this process, in which exfoliation of hBN can be seen. FIG. 23 shows an SEM image at 1 kV showing some BN layers that were semi-transparent or almost invisible. For BN layers to be semi-transparent to electrons at this voltage, their thickness needs to be about 20 nm.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates exfoliation of a sample of hexagonal nitride (hBN), comprising:
   mixing the sample of hBN with a metal halide activation agent and a set of selected chemicals consisting of transition metal halides or post-transition metal halides;
   intercalating the set of selected chemicals into the hBN by heating to obtain hBN intercalated with a set of intercalates from the set of selected chemicals;
   exfoliating the hBN intercalated with the set of intercalates through heating; and
   wherein heating in a reducing environment produces metals in exfoliated hBN and heating in air produces metal oxides in exfoliated hBN.

2. The method of claim 1, further comprising hydrating the set of intercalates.

3. The method of claim 2, wherein the hydration comprises exposing the set of intercalates to wet air.

4. The method of claim 1, further comprising washing the exfoliated hBN to remove the set of intercalates.

5. The method of claim 4, further comprising:
   mixing the washed hBN with the activation agent and a second set of selected chemicals;
   intercalating the second set of selected chemicals into the washed hBN to obtain washed hBN intercalated with a second set of intercalates from the second set of selected chemicals;
   exfoliating the washed hBN intercalated with the second set of intercalates.

6. The method of claim 4, wherein the washing comprises washing with HCl.

7. The method of claim 4, wherein the set of selected chemicals comprises a set of metal chlorides.

8. The method of claim 7, wherein the set of metal chlorides comprises one or more of $FeCl_3$, $AlCl_3$, $CuCl_2$, $SnCl_4$ or $MoCl_5$.

9. The method of claim 7, further comprising hot pressing the exfoliated intercalated hBN to create a ceramic composite article.

10. The method of claim 1, wherein the activation agent comprises NaF.

11. The method of claim 1, wherein the mixing comprises mixing the sample of hBN and the set of selected chemicals in a ratio of no more than one part of the sample of hBN for each two parts of the set of selected chemicals.

12. The method of claim 1, wherein the exfoliating comprises rapidly heating the intercalated hBN.

* * * * *